(12) United States Patent
Tsang et al.

(10) Patent No.: US 8,533,767 B1
(45) Date of Patent: Sep. 10, 2013

(54) METHOD AND SYSTEM FOR PRIORITIZING CONTENT IN A DELIVERY QUEUE OF A CONTENT DELIVERY SYSTEM

(75) Inventors: Jim Wei Chien Tsang, Redondo Beach, CA (US); Raynold M. Kahn, Los Angeles, CA (US); Lonnie Scott Clabaugh, San Pedro, CA (US); John D. Choi, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 371 days.

(21) Appl. No.: 13/039,118

(22) Filed: Mar. 2, 2011

(51) Int. Cl.
*H04N 7/173* (2011.01)

(52) U.S. Cl.
USPC .............. 725/114; 725/91; 725/93; 725/94; 725/95; 725/97; 725/105; 725/116; 725/117; 725/143; 725/144; 725/146; 725/147

(58) Field of Classification Search
USPC ......... 725/91, 93–95, 97, 105, 114, 116–117, 725/143–144, 146, 147
See application file for complete search history.

(56) References Cited

U.S. PATENT DOCUMENTS

| | | | | |
|---|---|---|---|---|
| 5,351,075 | A * | 9/1994 | Herz et al. | 725/13 |
| 5,497,187 | A * | 3/1996 | Banker et al. | 725/144 |
| 6,718,552 | B1 * | 4/2004 | Goode | 725/95 |
| 7,010,801 | B1 * | 3/2006 | Jerding et al. | 725/95 |
| 7,120,922 | B2 * | 10/2006 | Rodriguez et al. | 725/39 |
| 7,882,260 | B2 * | 2/2011 | Taylor et al. | 709/236 |
| 2002/0199200 | A1 * | 12/2002 | Addington | 725/97 |
| 2004/0088730 | A1 * | 5/2004 | Gopalan et al. | 725/93 |
| 2005/0144636 | A1 * | 6/2005 | Hirai | 725/35 |
| 2007/0220567 | A1 * | 9/2007 | Hu | 725/97 |
| 2009/0031376 | A1 * | 1/2009 | Riley et al. | 725/105 |
| 2009/0199227 | A1 * | 8/2009 | Kennedy | 725/13 |
| 2012/0131612 | A1 * | 5/2012 | Liu et al. | 725/39 |

* cited by examiner

*Primary Examiner* — Nicholas Corbo

(57) ABSTRACT

A system and method for communicating content to users that includes a prioritizer and a listing module communicating the category and content identifier for a content to the prioritizer. The prioritizer associates a lifecycle having a plurality of lifecycle states with the category, assigns a first priority to the content in response to a first lifecycle state of the plurality of lifecycle states, changes the first lifecycle state to a second lifecycle state and changes the first priority to a second priority in response to changing the first lifecycle state to the second lifecycle state.

48 Claims, 19 Drawing Sheets

Channel X

| Monday 11 p.m. → | Movie Trailer 1 |
| --- | --- |
| | Welcome Video 1 |
| 512 | Movie Trailer 2 |
| | Movie Trailer 3 |
| | Movie Trailer 1 |
| | Welcome Video 1 |
| 510 | Movie Trailer 3 |
| | Welcome Video 2 |
| | Movie Trailer 1 |
| | Welcome Video 1 |
| | Movie Trailer 2 |
| Tuesday 5 a.m. | Movie Trailer 3 |

FIG. 6

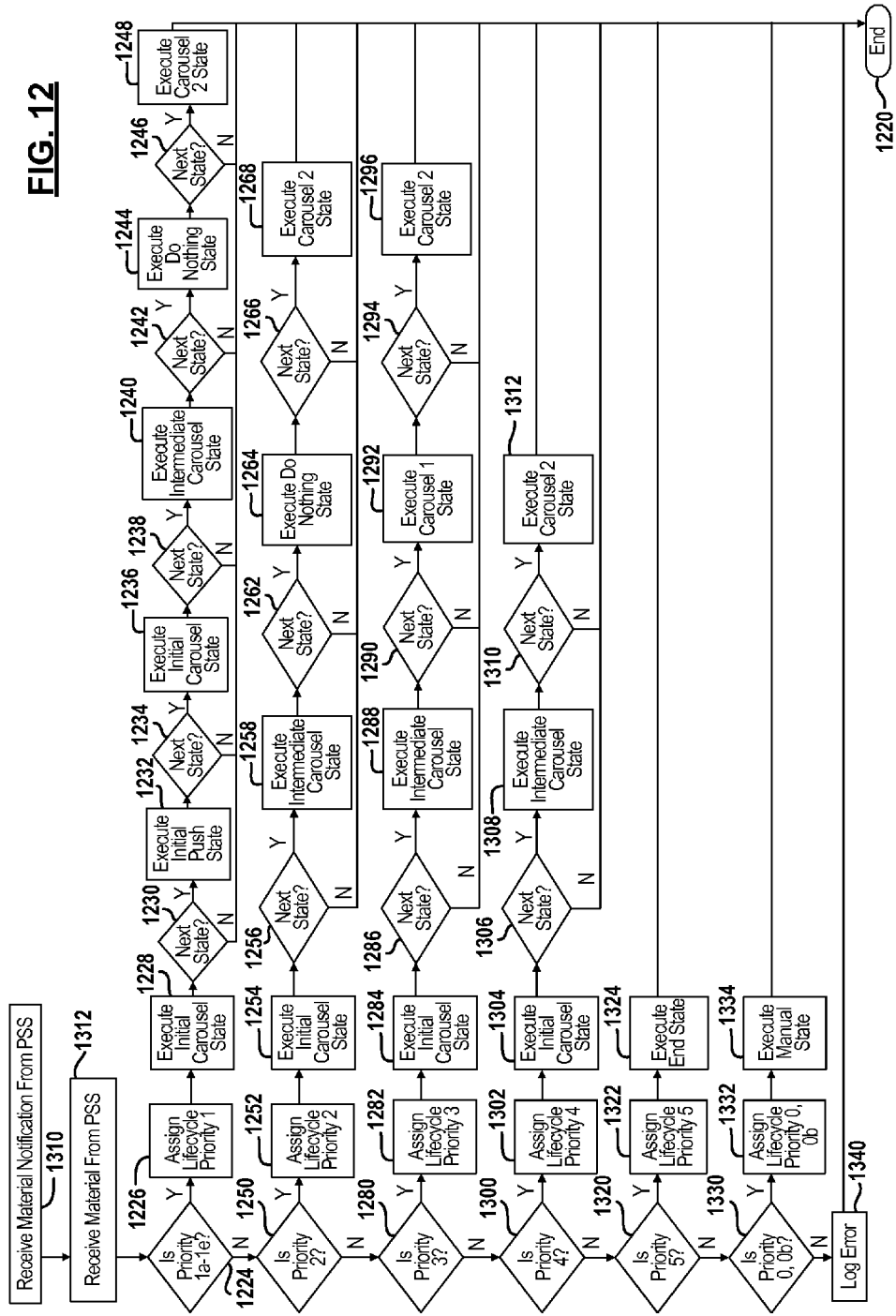

METHOD AND SYSTEM FOR PRIORITIZING CONTENT IN A DELIVERY QUEUE OF A CONTENT DELIVERY SYSTEM

TECHNICAL FIELD

The present disclosure relates to a content processing and delivery system and, more specifically, to a method and system for prioritizing content material in a delivery queue of a content delivery system.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content. Interactive content is increasing in popularity.

Satellite television broadcast systems typically use several satellites. Each satellite has several transponders that receive signals from the ground and broadcast the signals to users. Each transponder is capable of providing a certain amount of content therethrough. That is, each transponder may provide a certain bit rate therethrough. Satellite capacity usage may vary throughout the course of a day and course of a week. It is beneficial to the satellite system operator to use as much capacity as possible. The on-demand system provided by DIRECTV® uses broadband capacity as well as satellite capacity to communicate content to users. Broadband content is more expensive per bit than satellite content. Therefore, maximizing the use of the satellite for providing users desired content is beneficial. With numerous channels and types of content, manually managing a broadcast system leads to a system that is susceptible to human error. Automating broadcast systems which provide a reliable system for scheduling is desirable for improving customer experience.

SUMMARY

The present disclosure provides a system and method for assigning a priority (also called broadcast frequency, repetition rate) to content so that the quantity of content delivered is maximized and the delivery timeframe is minimized.

In one aspect of the disclosure, a method includes assigning a category and content identifier to a content; communicating the category and content identifier for the content to a prioritizer, associating a lifecycle having a plurality of lifecycle states with the category, assigning a first priority to the content in response to a first lifecycle state of the plurality of lifecycle states, changing the first lifecycle state to a second lifecycle state and changing the first priority to a second priority in response to changing the first lifecycle state to a second lifecycle state.

In another aspect of the disclosure, a system for communicating content to users includes a prioritizer and a listing module communicating the category and content identifier for a content to the prioritizer. The prioritizer associates a lifecycle having a plurality of lifecycle states with the category, assigns a first priority to the content in response to a first lifecycle state of the plurality of lifecycle states, changes the first lifecycle state to a second lifecycle state and changes the first priority to a second priority in response to changing the first lifecycle state to a second lifecycle state.

In an additional aspect of the disclosure, a prioritizer includes a lifecycle manager module that associates a lifecycle having a plurality of lifecycle states with a category of a content. The prioritizer also includes a priority manager module that assigns a first priority assignment to the content in response to a first lifecycle state of the plurality of lifecycle states. The prioritizer also includes a state module that changes the first lifecycle state to a second lifecycle state based on a time. The priority manager module changes the first priority assignment to a second priority assignment in response to changing the first lifecycle state to a second lifecycle state.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a schematic representation of a channel block according to the present disclosure.

FIG. 12 is a flowchart of a method of adding new material to the prioritizer and its associated lifecycle.

DETAILED DESCRIPTION

Figure 1:
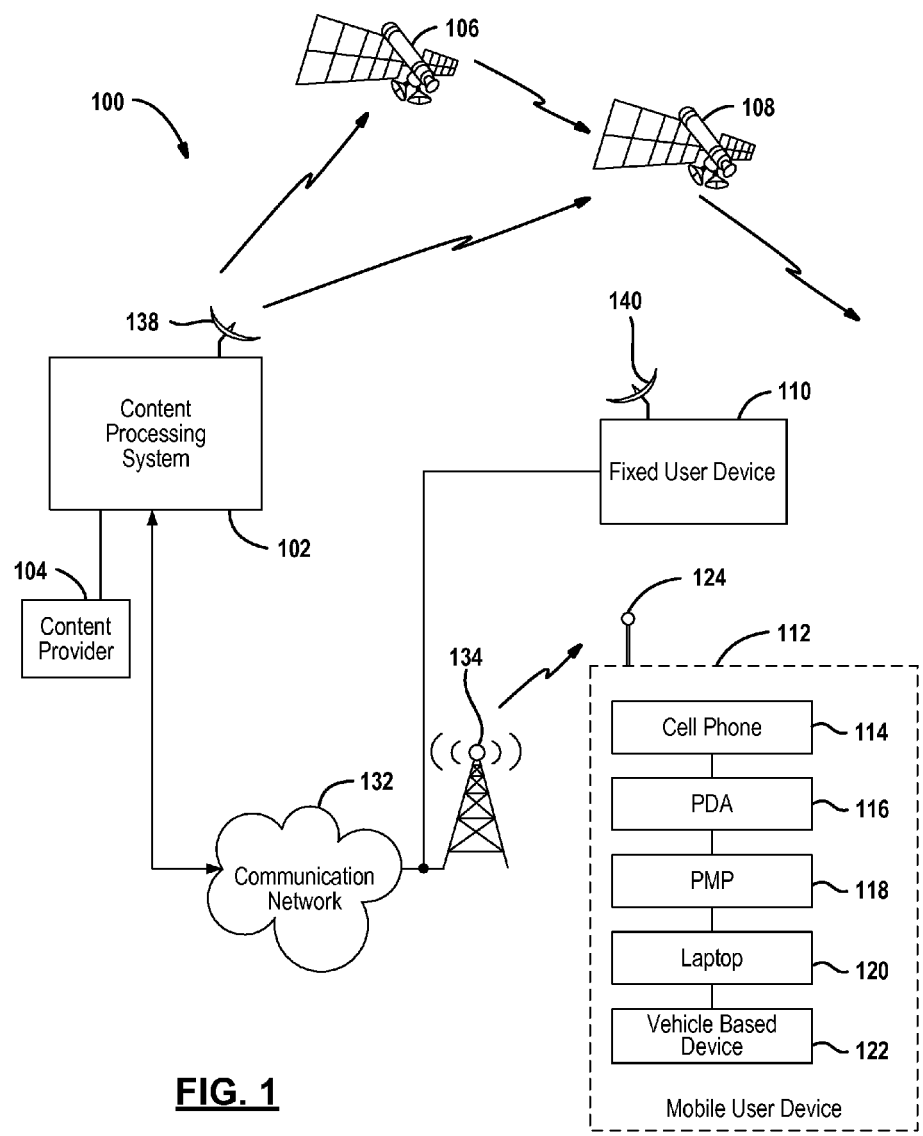
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to disclosed systems and methods. Such systems include other wireless distribution systems, wired or cable distribution systems, cable television distribution systems, ultra high frequency (UHF)/very high frequency (VHF) radio frequency systems or other terrestrial broadcast systems (e.g., multi-channel multi-point distribution system (MMDS), local multi-point distribution system (LMDS), etc.), Internet-based distribution systems, cellular distribution systems, power-line broadcast systems, any point-to-point and/or multicast Internet protocol (IP) delivery network, and fiber optic networks. Further, the different functions collectively allocated among a head end (HE), integrated receiver/decoders (IRDs) and a content delivery network (CDN) as described below may be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a content communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data or content provided to content processing system 102 from the media source 104 may be transmitted, for example, via an uplink antenna 138 to the satellites 106,108, one or more of which may be a geosynchronous or geo-stationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. A carousel of multiple program materials may be scheduled within the content processing system 102 whereby the satellites 106, 108 may be used to communicate metadata and content to the user devices 110, 112. The repetition rate and blocks of content and metadata may vary as described below. To receive the information rebroadcast by satellites 106, 108, each user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
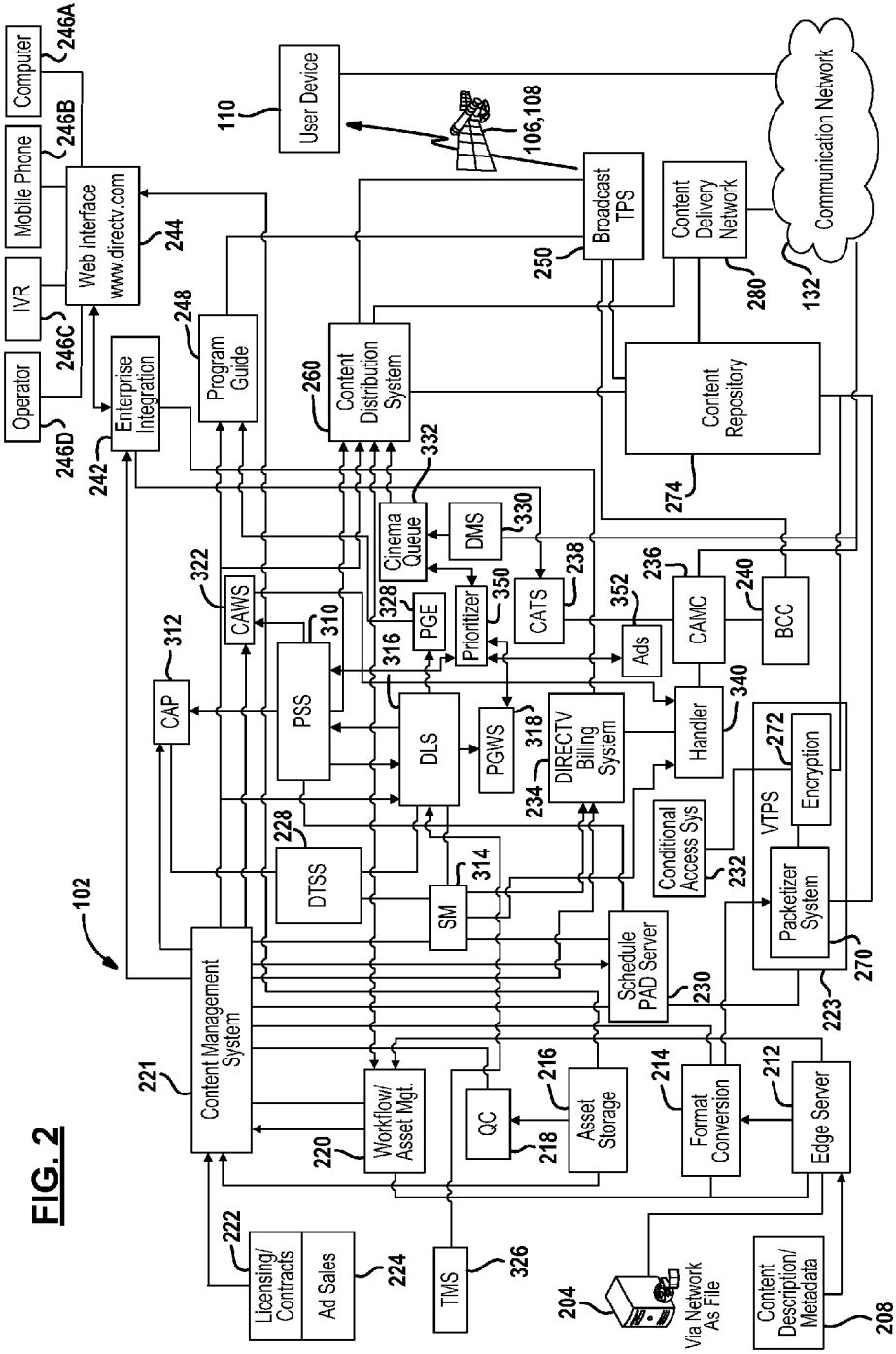
FIG. 2 is a detailed block diagrammatic view of the content processing system of FIG. 1.

Referring now to FIG. 2, the content processing system 102 of FIG. 1 is illustrated in further detail. The content processing system 102 may also be referred to as a head end. The content provider 104 may include various types of content providers, including those that provide content via a network as a file in 204, or by way of a satellite, or by way of recorded media such as DVD, tapes and other means. The content provider 104 may also provide a content description and other metadata 208 to the system. An input server 212 such as an edge server may receive the various content and associated metadata and convert the format in a format conversion system 214. A house format asset storage server 216 may be used to store the content asset in a house format. Still image files, trailers, and other information may also be stored in the house format asset storage server. A quality control system 218 may monitor files for quality and completeness.

A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The content management system 221 may also receive file properties from the quality control system 218.

The video transport processing system (VTPS) 223 may encode the packets containing the content. The encoder may encode the data into various transport formats such as DIRECTV® proprietary formats, or industry standard formats. The encoded data is then packetized into a stream of data packets by a packetizer 270 that creates pre-packetized unencrypted files. The packetizer 270 also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

An encryption module 272 receives the output of the packetizer system 223 and encrypts the packets. The stream of data packets (i.e., a bitstream) is then broadcast encrypted by, for example, the well-known advanced encryption standard (AES) or the well-known data encryption standard (DES). In an example, only the payload portion of the data packets are encrypted thereby allowing a user device 110 to filter, route and/or sort received broadcast encrypted data packets without having to first decrypt the encrypted data packets. Fully packaged and encrypted files may also be stored in the content repository 274. Encryption may take place in the data portion of a packet and not the header portion.

The content management system (CMS) 221 generally controls the overall movement and distribution of content through the content processing system 102. The CMS 221 may be used to determine which content delivery network is to be used by generating a content delivery network identification. This will be described further below.

Licensing and contract information 222 and advertisements (ads) from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A schedule PAD server (SPS) 230 may be coupled to the content management system (CMS) 221. The CMS 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

The schedule PAD server (SPS) 230 may be used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 (of FIG. 1) are charged for subscription services and/or according to asset downloads or viewings (e.g., pay-per-view TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed. The billing system 234 records that a user has been authorized to view a movie once an unlocking signal is received, and the user is billed for the movie. The billing system may receive an unlocking signal comprising a purchase request from the user. In this example the user may order the movie by way of a computer 246A connecting to a website, a mobile phone 246B, an interactive voice system 246C and by a phone call to an operator 246D. The billing system 234 may bill the user account and send an authorization signal to the user device 110. The billing system 234 may also receive an unlocking signal comprising a report back that content has been unlocked at the user device. In this example, the user may order the movie via a user interface purchase menu of the user device. The user device may allow viewing, and may report back the unlocking signal by way of a phone connection or a broadband connection to the head end. The billing system 234 may bill the user account when the report back is received. As will be described further below, content may be stored in a user device but may not be accessible until it is played back. Some content may never be unlocked. When the content is unlocked such as played back, the user account is billed with the unlock signal that is communicated back to the billing system 234. Push content, wanted list content or other content not specifically requested may be unlocked in this manner.

A billing system 234 receives pricing and availability information from the content management system 221. A conditional access management system (CAMC) 236 receives callback information from the communication network 132. The conditional access management system 236 may be used to generate authorizations, pay-per-view billing data, and callback data from the billing system 234. Remote record requests may also be provided from the conditional access transaction system 238. A conditional access broadcast control system BCC 240 may be used to communicate a conditional access packet (CAP) from the information from the conditional access management system 236. The CAP may include a content title to be added to the wanted list at the user device. The CAP may also include the network location, channel and time that content will be broadcasted so that the user device may be tuned to it to record the content. The CAP may also include a content authorization signal so that the user device may allow the content to be viewed.

The billing system 234 may generate purchase data that is provided to the enterprise integration (EI) block 242. The enterprise integration block 242 may generate remote record requests to the conditional access transaction system 238. Content purchase requests and remote record requests may be generated through a web interface such as DIRECTV®.com in block 244. Access to the website 244 may be obtained in numerous ways including through a computer 246A, a mobile phone 246B, an interactive voice response system 246C and by an operator 246D. The computer 246A may be in communication with the web interface 244 through the internet, or the like. A website may prompt the user for ordering various content. Likewise, the mobile phone 246B may be in communication with the web interface. The mobile phone 246B may be a web-enabled device that allows access to the internet. An interactive voice recognition system 246C may provide the user prompts for ordering specific content. The user of the system may also contact the operator 246D who may interact with the web interface 244 on behalf of the user.

Various ordering information, such as ordering broadband video, pay-per-view, wanted list additions and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. A program guide may also include information that a user device uses to assemble programming for display to a user. For example, the program guide may be used to tune to a channel on which a particular program is offered. The program guide may also include a content delivery network identifier through which content is available for downloading. The program guide may also contain information for tuning, demodulating, demultiplexing, decrypting, depacketizing, or decoding selected programs.

Content files may also be provided from the content management system 221 to the content distribution system (CDS) 260.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (e.g., a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols, such as file transfer protocol (FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include files (e.g., movies, pre-recorded TV shows, games, software updates, asset files, pushed content, wanted list content, etc.) and/or live content, data, programs and information. Wireless delivery via the satellites 106, 108 offers the opportunity to deliver, for example, a number of titles (e.g., movies, pre-recorded TV shows, etc.) to virtually any number of customers with a single broadcast. As will be described below, the content may be carouseled to repeatedly provide content to customers on a push basis or as requested through a wanted list.

In contrast, Internet-based delivery via the CDN 280 may also support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110, 112 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

A push scheduling system (PSS) 310 is used for scheduling Push and Carousel content to the various user devices. Push content is content that is not requested by a user but is delivered to a user device for eventual or possibly eventual use by the user. Push content is received and stored by a user device if the content is marked with a content reference identifier (CRID). Push content is non-linear which is broadcasted as a non-real-time content file via satellite, which is different than linear content broadcasted as a real-time program at a scheduled time. Carousel content is content that is requested by the user. Carousel content is received and stored by a user device if the content title is in a user's wanted list. Carousel content is also non-linear. The push scheduling system 310 may be in communication with a conditional access processor 312. The conditional access processor 312 may be used for requesting program-associated data such as future program-associated data, current program-associated data, or ending program-associated data. The program-associated data may be a variety of data files including duration, actors, directors, short description, the studios, or various other types of metadata. The program-associated data may be accessed from the content management system 221 or push scheduling system 310. The schedule PAD server 230 may receive the program-associated data and deliver the program-associated data to various devices.

The Subscription Manager (SM) 314 may be in communication with the traffic and scheduling system 228. The Subscription Manager may forward event code pricing which is provided to the DIRECTV® listing service (DLS) 316.

The program guide web service (PGWS) 318 may receive listings from the DIRECTV® listing service 316 so that access to program guide information may be communicated via the internet. The program guide web service 318 may interface with the web interface and other service partners for providing programming data thereto.

The push scheduling system 310 may also be in communication with a conditional access web service (CAWS) 322. The conditional access web service 322 may provide a web service for processing conditional access data. The Subscription Manager 314 may send content updates to the conditional access web service through the content management system.

A T20 handler (T20H) 340 receives data from the conditional access web service 322 and controls the communication to the CAMC 236.

The DIRECTV® listing service 316 may also supply content material such as metadata in addition to channel data to the push scheduling system 310. The channel data may include, but is not limited to, channel start time, a channel stop time, a content channel bit rate, a transponder identifier, and a service channel identifier. CRID and scheduling data may be requested by the DLS from the push scheduler 310.

An external content data source 326, such as Tribune Media Services® (TMS) may provide data to the listing service 316. Content identifiers that uniquely identify each content may be provided to the listing service 316. The external source 326 may provide description data, actor data, poster data, studio data, pictures, trailers and the like to the content processing system 102.

A program guide extractor (PGE) 328 receives schedule data from the listing service and provides the schedule data to the content distribution system 260. The program guide extractor communicates data that is eventually used in the program guide system 248.

A DIRECTV® monitoring server (DMS) 330 is in communication with a user device 110. The user device 110 communicates callback information and data through the diagnostic monitoring server 330. The DMS 330 may also generate a signal corresponding to the success or failure of a transaction. The DMS 330 may be used to obtain data from the user devices corresponding to content within such user's wanted list. The DMS 330 may aggregate the data and provide the data to a cinema queue module 332.

The DMS 330, as described above, may receive the user's wanted list and the data associated therewith. The associated data may include the event times when a content title is added to the wanted list, when the content is received and stored, and when it is purchased and viewed. The DMS data may be aggregated over a large number of user wanted lists to determine a weighted ranking of content titles, a recording timeline and a carousel purchase rate. The weighted title ranking of a content title is the percentage of wanted lists that include the title. The recording timeline of a title is the percentage of wanted list recordings that occur on the first day, second day, third day, etc. The carousel purchase rate is the percentage of wanted list titles that get purchased.

The weighted ranking, the recording timelines and the purchase rate may all be determined in a cinema queue module 332. From these various data points, the content queues and priorities, as well as the life cycles, may be established. The content may then be communicated to the users from the prioritized content queues.

The cinema queue module (or cinema queue) 332 may be in communication with the DIRECTV® monitoring server (DMS) 330. The cinema queue 332 may be used to provide various data for prioritization of content. The data may be received from the DMS 330. The cinema queue 332 may provide a user device identifier, an external identifier such as a TMS identifier, a format, material identifiers, the position of each external identifier on each customer's wanted list, the number of customers with the external identifier on the cinema queue module 332 and how each customer is connected. The daily ranking score of the content titles may be calculated with the content data from the cinema queue module 332 so that the content may be organized for distribution through the carousel. The repetition rate and the frequency of the carousel may be adjusted based upon the data from the cinema queue module 332.

A prioritizer module (prioritizer) 350 may be in communication with various components including, but not limited to, the cinema queue 332, the program guide web service 318 and the push scheduling system 320. The prioritizer 350 may also be in communication with the advertising module (ads) 352. The advertising module 352 may be used to provide advertising scheduling to the system. The advertising module 352 will be further described below. The advertising module 352 may be linked with ad sales 224 described above.

The prioritizer 350 accepts content material metadata from the push scheduling system 310 and receives instructions about the content material from the cinema queue 332. Each content material that may be prioritized is provided with a content material identifier which is provided through the PSS 310 to the prioritizer 350.

The push scheduling system 310 supports the priorities for which the prioritizer may use to schedule content material.

The operation of the various interactions of the components associated with the prioritizer 350 and the use of PSS 310 for communicating content to the user devices 110, 112 will be further described below.

Figure 3:
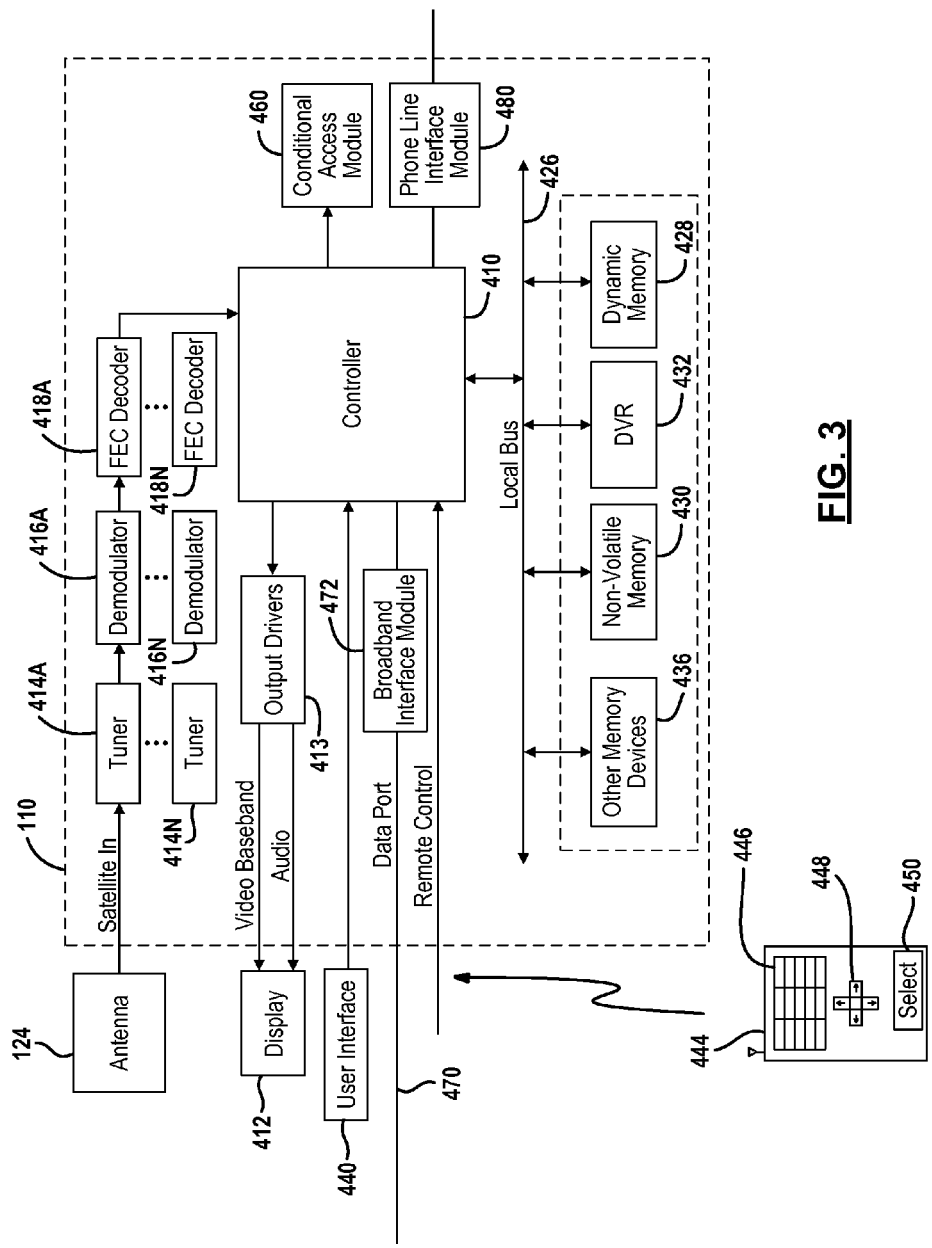
FIG. 3 is a detailed block diagrammatic view of the user device of FIG. 1.

Referring now to FIG. 3, a user device 110 such as a fixed user device is illustrated. A similar configuration for a mobile user device may also be used. The fixed user device may include a fixed antenna. If the user device is a mobile user device, the antenna 124 may be a rotating antenna that is used to track the relative movement of the satellite or an omnidirectional antenna that may receive antenna signals from various directions.

The user device 110 may include a controller 410. The controller 410 may control various operations as will be described below. The user device 110 may be in communication with a display 412 through output drivers 413. The output drivers 413 may generate desired audio and video output formats suitable for the particular display 412.

The controller 410 may be a general processor such as a microprocessor. The controller 410 may be used to coordinate the control and the functions of the user device. These functions may include the functions of a tuner 414, a demodulator 416, a forward error correction decoder (FEC) 418 and any buffers or other functions. More than one tuner, demodulator and FEC decoder 418 may be provided as indicated by the reference numerals "A" and "N". One constructed embodiment may include four tuners, demodulators and decoders, although various numbers of tuners, demodulators and decoders may be provided depending upon the system requirements. The tuner 414 receives the signal or data from the individual channel. The demodulator 416 demodulates the signal to form a demodulated signal or demodulated data. The decoder 418 decodes the demodulated signal to form a decoded data or decoded signal.

The controller 410 may also be coupled to a local bus 426. The local bus 426 may be used to couple a memory, including a dynamic memory 428, such as RAM which changes often and whose contents may be lost upon the interruption of power or boot up. The bus 426 may also be coupled to a non-volatile memory 430. One example of a non-volatile memory is an EEPROM. One specific type of EEPROM is flash memory. Flash memory is suitable since it is sectored into blocks of data that may be individually erased and rewritten.

A digital video recorder (DVR) 432 may also be in communication with the local bus 426. The digital video recorder 432 may be used for storing various data and various content. The various data stored within the DVR may include metadata such as titles, actors, directors, descriptions, posters, identifiers, availability start times, availability end times, pricing data, timing data and various other types of data.

Other memory devices 436 may also be coupled to the local bus 426. The other memory devices may include other types of dynamic memory, non-volatile memory, or may include removable memory devices. The display 412 may be changed under the controller 410 in response to data in the dynamic memory 428 or non-volatile memory 430.

The controller 410 may also be coupled to a user interface (UI) 440. The user interface 440 may be various types of user interfaces such as a keyboard, push buttons, a touch screen, a voice activated interface, or the like. The user interface 440 may be used to select a channel, select various information, change the volume, change the display appearance, or other functions. The user interface 440 may be used in addition to a remote control device 444. The remote control device 444 may include a keypad 446, an arrow keypad 448, and a select button 450. Inputs to the user device may be provided by the remote control device or through the user interface 440.

A conditional access module card 460 (CAM) may also be incorporated into the user device. Access cards, such as a conditional access module, may be found in DIRECTV® units. The access card 460 may provide conditional access to various channels and wireless signals generated by the system. The access card 460 may control the decryption of program content. Not having an access card or not having an up-to-date access card 460 may prevent the user from receiving or displaying various video and other content from the system.

The controller 410 may also be in communication with a data port 470. The data port 470 may be a broadband data port that is coupled to the controller 410 through a broadband interface module 472. The broadband interface module 472 may allow wireless or wired communication between external devices with the controller 410. The controller 410 through the broadband interface module 472 may communicate with the internet and various systems such as the head end of the content communication system. Callback signals may be provided through the broadband interface module 472 from the controller 410.

The controller 410 may also be in communication with a phone link interface module 480. The phone link interface module 480 may couple the user device 110 to a PSTN. The user device 110 may generate callback signals to the head end through the phone interface module 480.

Callback signals provided through the broadband interface module 472 or the phone interface module 480 may include ordering information and wanted list information. The wanted list information may be provided to the cinema queue module 332 via the DMS 330 as illustrated in FIG. 2. The wanted list data may be used to control the parameters of the content distribution system 260.

Figure 4:
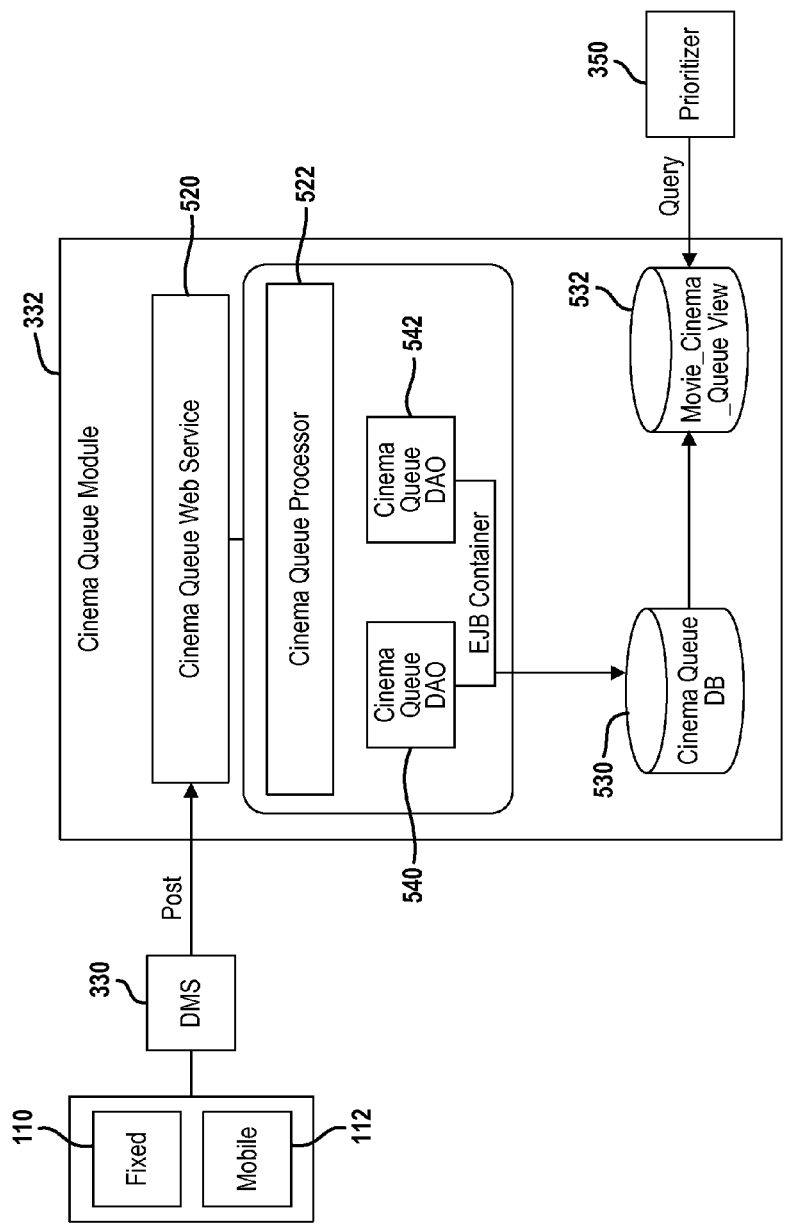
FIG. 4 is a block diagrammatic view of the cinema queue module illustrated in FIG. 2.

Referring now to FIG. 4, the cinema queue module 332 is illustrated in further detail. The cinema queue module may be an application that includes a cinema queue web service 520 that is used for communicating with the DIRECTV® monitoring server 330 and the user devices 110. As mentioned above, the DMS 330 provides data from the user devices to the cinema queue web service 520. Both user devices that are fixed and connected to a network and those that are mobile may provide data to the cinema queue web service 520. The web service 520 may be responsible for communicating with external applications or components. The cinema queue web service 520 may be in communication with a cinema queue processor 522. The cinema queue processor 522 may be used to perform various functions including communication with a cinema queue database 530 which in turn may be in communication with a movie cinema queue view 532. The movie cinema queue view 532 may be in communication with the prioritizer 350. The prioritizer 350 may provide queries to the movie cinema queue 532 to obtain data such as content demand.

The cinema queue processor 522 may be in communication with the cinema queue data access object (DAO) 540. The cinema queue data access object may provide an interface to the cinema queue database 530. The cinema queue processor may also generate a cinema queue item data access object 542. Both data access objects 540 and 542 may be used to access content and store content within the cinema queue database 530. Essentially, the cinema queue processor 522 processes the incoming data and updates, creates or deletes the data from the cinema queue database using the data access objects 540, 542. The data access objects 540, 542 may be implemented in many manners, including an enterprise Java bean (EJB).

The items to be updated, deleted or otherwise processed relative to the database 530 may be processed in a batch manner. The cinema queue database may include various information such as a user device identifier, an account identifier, a content identifier, a format identifier, a material identifier, a position identifier that ranks the position of the movie on the customer's wanted list, and a connection-type identifier. The cinema queue database is essentially an aggregated list of content wanted by the various users. This may be referred to later as a wanted list. Because of the database structure data from the cinema queue module 332 may be used in various ways including indicating demand to components of the system so that broadcast priorities may be shifted to meet the needs of the users.

Figure 5:
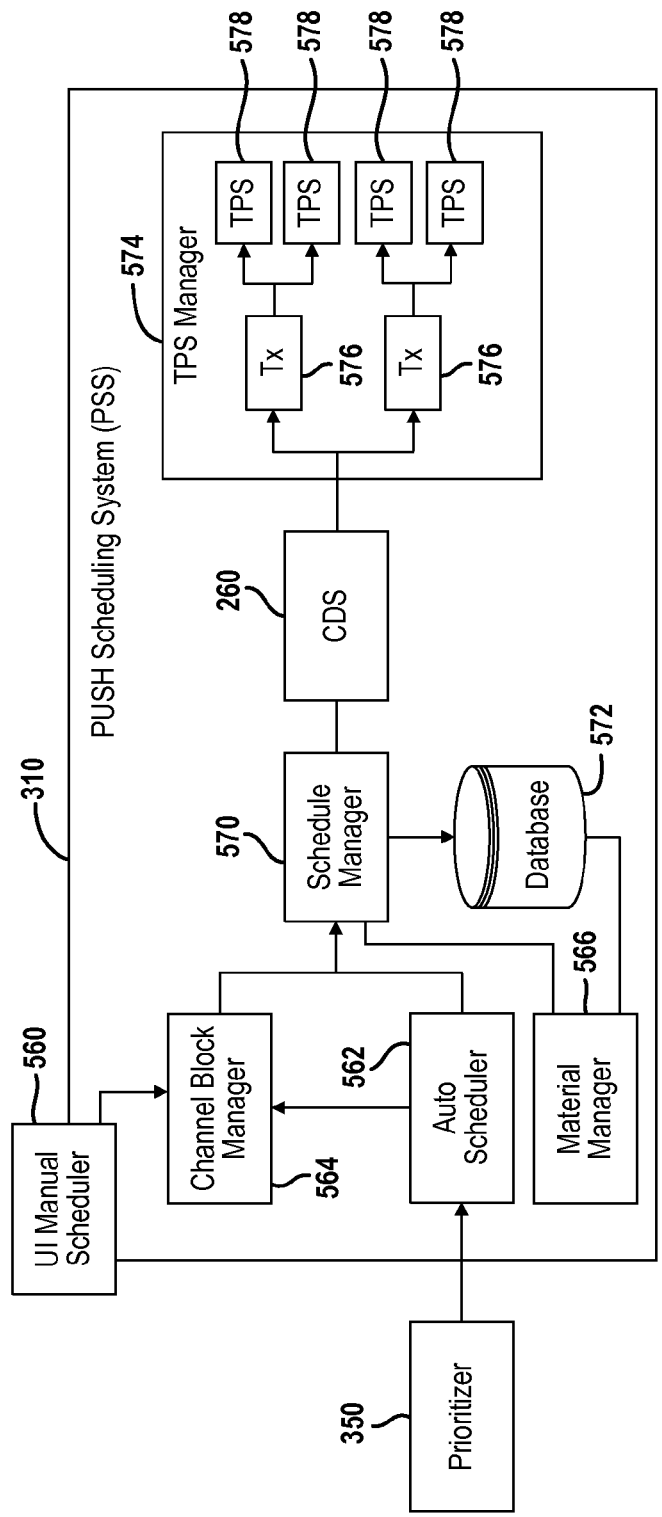
FIG. 5 is a block diagrammatic view of a push scheduler architecture for the push scheduling system illustrated in FIG. 2.

Referring now to FIG. 5, the push scheduling system (PSS) 310 is illustrated in further detail. The push scheduler 310 may include a user interface for a manual scheduler 560 that provides an interface to the system operator for manually scheduling content material by forming an assignment within a channel block.

An auto scheduler 562 may also be included within the push scheduler 310. The auto scheduler 562 may automatically schedule content based on data from the prioritizer 350. The auto scheduler 562 may also receive content scores from an external system based upon requested downloads. Content material is then scheduled automatically, simplifying the scheduling task. The content material is repeated at a frequency that is appropriate for its priority, while the content material has not expired. The order of the scheduling of content material may be FIFO (first in, first out) or another suitable algorithm. The assignment of content to priorities will be further described below.

The push scheduling system 310 may also include a channel block manager 564. The channel block manager 564 may be used to determine the channel blocks based upon the channel data and schedules received from the listing service. The channel blocks may include time slots. The channel block may extend over various time periods including more than one day. The channel block manager 564 may define the channel blocks and update channel blocks based upon changes from the listing service.

The push scheduling system 310 may also include a material manager 566. The material manager 566 may control various user interface sessions based upon various material schedule timelines. The material manager 566 may be used to control the importation of various content as well as generating CRID. The material manager 566 may communicate CRIDs to the listing service schedule. The material manager 566 may also be used to control the program-associated data and the requesting of program-associated data. The material manager 566 may provide timing for providing various material data as well as material timing. This will be described further below.

The push scheduling system 310 may also include a schedule manager 570 that assigns the material to be broadcast within the channel blocks. The schedule manager 570 generates an assignment of the push and carousel content material to the channel blocks from the channel block manager 564 to form an assignment. The schedule manager 570 may retrieve various data from a database 572. The material manager 566 may also store and retrieve data from the database 572.

The schedule manager 570 may include an event scheduler that communicates with the content distribution system in FIG. 2. The schedule manager 570 may also include an event scheduler that communicates with a TPS manager 574. Communication may take place through CDS 260. The TPS manager 574 may include transmission processors 576 that communicate various content material to the transport processing systems 578 according to the assignments. Various channels may be present on various transport processing systems 578. The transport processing system 578 may be incorporated in the broadcast TPS 250. The channels described herein may be broadcast-type channels but may not correspond to network-type channels. The channels described herein may be channels within the transport processing system 578 that are used for data and are assigned based on various times and the like. The channels may be referred to as service channels. Broadcasting channels may be assigned to different TPS channels at various times of the day or week.

The transmission blocks 576 may include a multiplexer for joining various channels together as well as a modulator. Other components may also be included in the transmission blocks 576 depending on the type of network through which the push material is communicated.

Referring now to FIG. 6, an example of a channel block 510 is illustrated for broadcast Channel X. As mentioned above, the channel block 510 may provide various types of content. In this example, movie trailer 1, movie trailer 2 and movie trailer 3 are all provided within various time blocks 512 of the channel block 510. The push scheduling system may automatically provide repeated occurrences of various types of push and carousel content. For example, movie trailer 1 is repeated within the channel block three times. The recurrence rate is the rate at which the content is repeated. The welcome video 1 is repeated twice, movie trailer 2 is repeated twice and movie trailer 3 is repeated 3 times. The operator of the push scheduling system 310 may merely place the number of iterations for broadcasting various push and carousel content. The push scheduling system 310 may thus automatically configure the channel blocks. By broadcasting the content a repeated number of times, it is likely that a tuner within a set top box or other user device will be available for receiving the push and carousel content. The push scheduling system 310 may determine a recurrence rate for the push schedule so that the content is likely to be received and stored within the user device.

Figure 7:
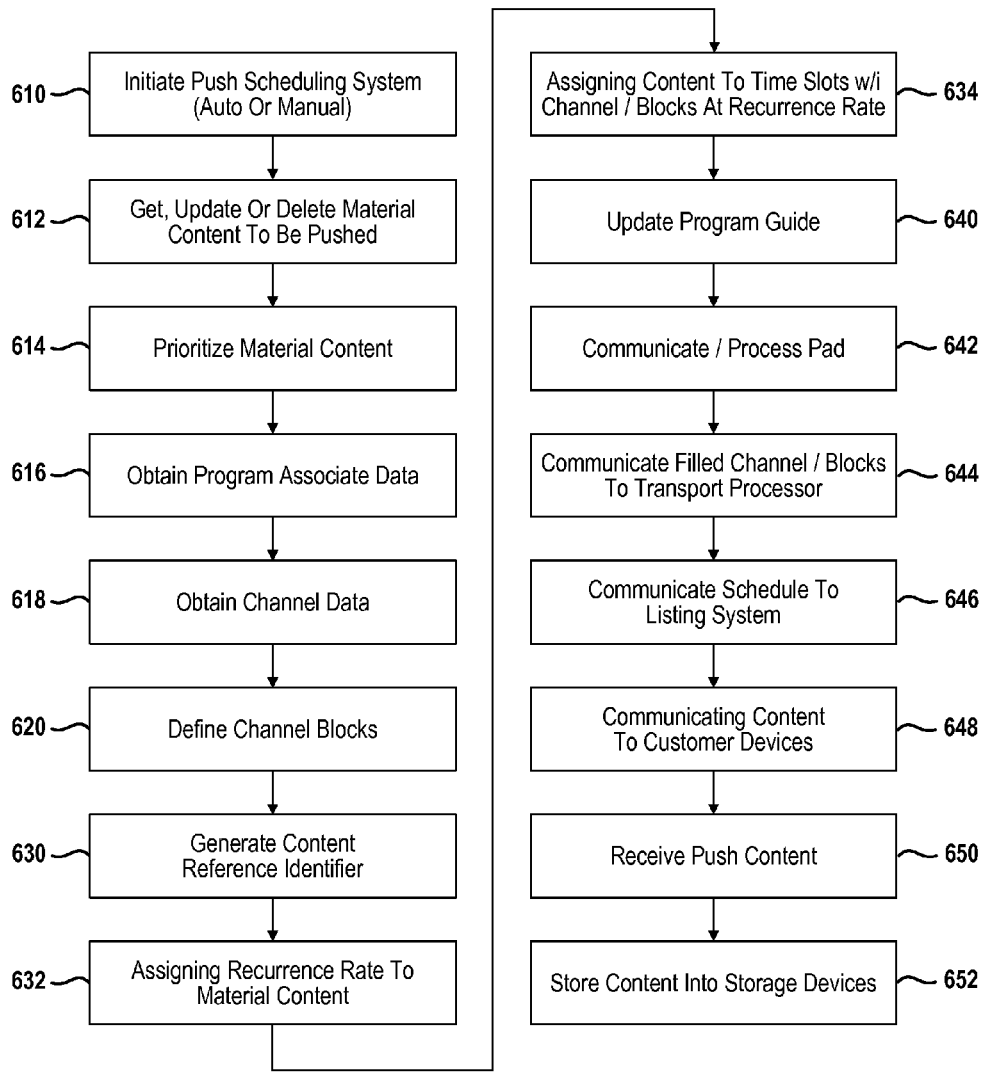
FIG. 7 is a flowchart of a method for operating the push scheduler system.

Referring now to FIG. 7, a method for operating the push scheduling system 310 is set forth. It should be noted that this is only one method for operating the push scheduler as other variations are described above.

In step 610, the push scheduling system 310 is initiated. The push scheduling system 310, as mentioned above, may be automatically initiated or manually initiated. If manually initiated, a scheduling user manually enters schedule information into PSS. If automatically initiated, the Prioritizer defines which content to schedule and associates it with a priority. The priority may be based upon the number of downloads requested for a particular content or other criteria.

In step 612, material metadata for content to be pushed or carouseled is obtained or identified by the push scheduler. The material metadata may be received or stored in a content management system and provided only when it is desired to broadcast the content. The system may also be updated as to changes in the material that are available. Changes may include deletions of material. In step 614, the material content may be prioritized.

In step 616, the program-associated data (PAD) corresponding to the content may be obtained by the push scheduling system. The program-associated data may be received from the SPS 230 system as described above.

In step 618, channel data may be obtained from a listing service (DLS). The listing service may obtain the channel data from a data service. The channel data may include the schedule times of broadcast as well as the associated broadcast channel and other identifiers.

In step 620, the push scheduling system forms channel blocks from the channel data. The channel blocks correspond to a time period on a particular channel that is available for broadcasting push and carousel content. Channel blocks may be defined for different types of materials. A channel block may, for example, be set-up to communicate different types of content such as high definition content, standard definition content, or specific types of content such as a movie trailer channel block, a welcome video channel block, a movie channel block, advertising channel block or the like.

In step 630, if content is provided that does not yet have a content reference identifier (CRID), and a CRID is needed, a content reference identifier will be generated.

In step 632, a recurrence rate of the content material may be assigned. The recurrence rate may be automatically assigned based upon the type of content or may be manually assigned by a system operator. In step 634, content is assigned to time slots within the channel blocks. This is performed by the schedule manager 570 as described above. The assignment of content to the time slots may be based upon the recurrence rate so that the number of recurrences within the time block meets the specified recurrence rate from step 632. When the assignment is performed a push schedule is generated for the channel block.

In step 640, the program guide is updated with the scheduled data. In step 642, program-associated data (PAD) may be processed by the schedule pad server and communicated to the user devices. In step 644, the filled channel block schedule is communicated to a transport processor or CDS. In step 646, the schedule is also communicated to a listing system. In step 648, the content is communicated to customer devices. In step 650, the push and carousel content is received by the user device. In step 652, the content is stored into the storage devices. The content may be stored in a pushed content area (network) for material that is pushed, or a user area if the content was carouseled, and the user device requested the recording of the material.

Figure 8:
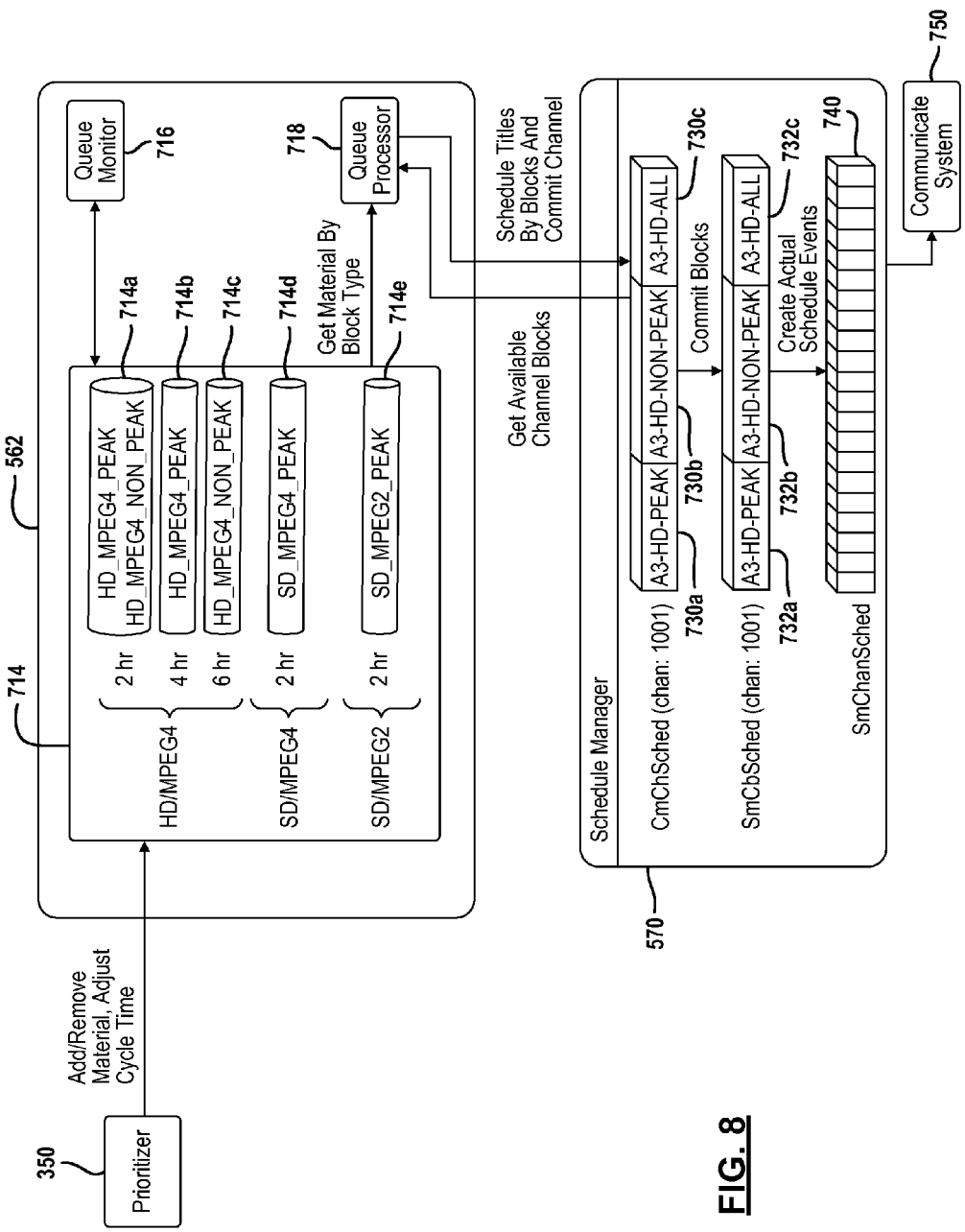
FIG. 8 is a block diagrammatic view of the auto scheduler 212.

Referring now to FIG. 8, the auto scheduler 562 is illustrated in further detail. The auto scheduler 562 may be used to automate the schedule of material on channel blocks as frequently as desired to increase the likelihood of material reaching the customer's set to box or user device based on input from the prioritizer 350. The material scheduling onto the channel blocks may take into consideration the start and stop times of the material, the linear time, the priority level, and the schedule in advance value associated with the priority's block type. Content material may be broadcasted with CRID values that may include an actual CRID value or a null CRID value. In this example, the block types are not associated with a particular system type and the definition type so the user may be responsible for assigning a block type mapped to channels with compatible system types and definition types. An example of a system type is A3, legacy and the like. A definition type may be standard definition or high definition. The prioritizer 350 may provide data to add or remove content material and adjust cycle times of the content. Items may be associated with a priority. Items may be removed from PSS based upon an expiration time and/or date. A cycle time associated with the priority may also be specified. The cycle time associated with the priority is the expected amount of time it takes for the system to broadcast all content associated with the priority before restarting the sequence of broadcasting for that priority. A pay-per-view identifier may also be associated and broadcast with the particular material.

The prioritizer 350 is in communication with PSS, to add and remove content and to change the priority of content 714. There may be a plurality of priorities that may be defined by transport type and a definition type. For example, a plurality of priorities 714a-714e is illustrated in this example. Priority 714a corresponds to a high-definition MPEG-4 peak and non-peak type, priority 714b corresponds to a high-definition MPEG-4 peak type, and priority 714c corresponds to a high-definition MPEG-4 non-peak type. Each of the priorities 714a-c corresponds to high-definition and MPEG-4. The priorities may also have associated cycle times such as two-hour, four-hour and six-hour cycles, respectively.

Another priority 714d corresponds to a standard definition MPEG-4 peak while priority 714e corresponds to a standard definition MPEG-2 peak type.

A monitor 716 may track the actual cycle times and provide a progress summary through the user interface 712 to the system operator 710.

Figure 14:
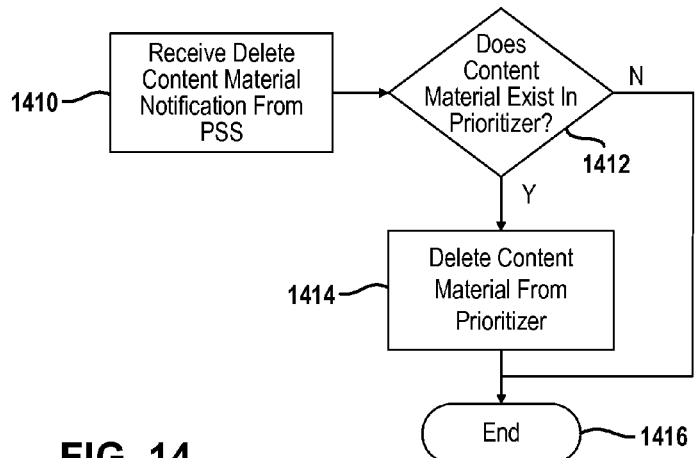
FIG. 14 is a flowchart of a method for deleting content material from the prioritizer.

A material scheduler (or queue processor) 718 may be used to ultimately assign the contents to channel blocks. The material scheduler 718 may get the blocks and compile a list of titles for the blocks using the priority queues 714a-714e. The material scheduler 718 may be in communication with the schedule manager 570 that schedules the various channels. As is illustrated in FIG. 14, the schedule manager may have various channel blocks associated therewith. The channel blocks are provided to the material scheduler 718 from the schedule manager 570 and the titles are scheduled onto blocks. As illustrated, various channel blocks 730a, 730b, 730c include an A3HD peak block 730a, an A3HD non-peak block 730b, and an A3HD peak and non-peak block 730c. Blocks 732a, 732b and 732c illustrate committed blocks for channels. Blocks 740 illustrate the committed channel schedule with the various blocks inserted therein. Each of the individual scheduled items in 740 corresponds to a particular content title to be communicated to the user device. A communication system 750 communicates the content in the channel blocks to the user device.

Figure 9:
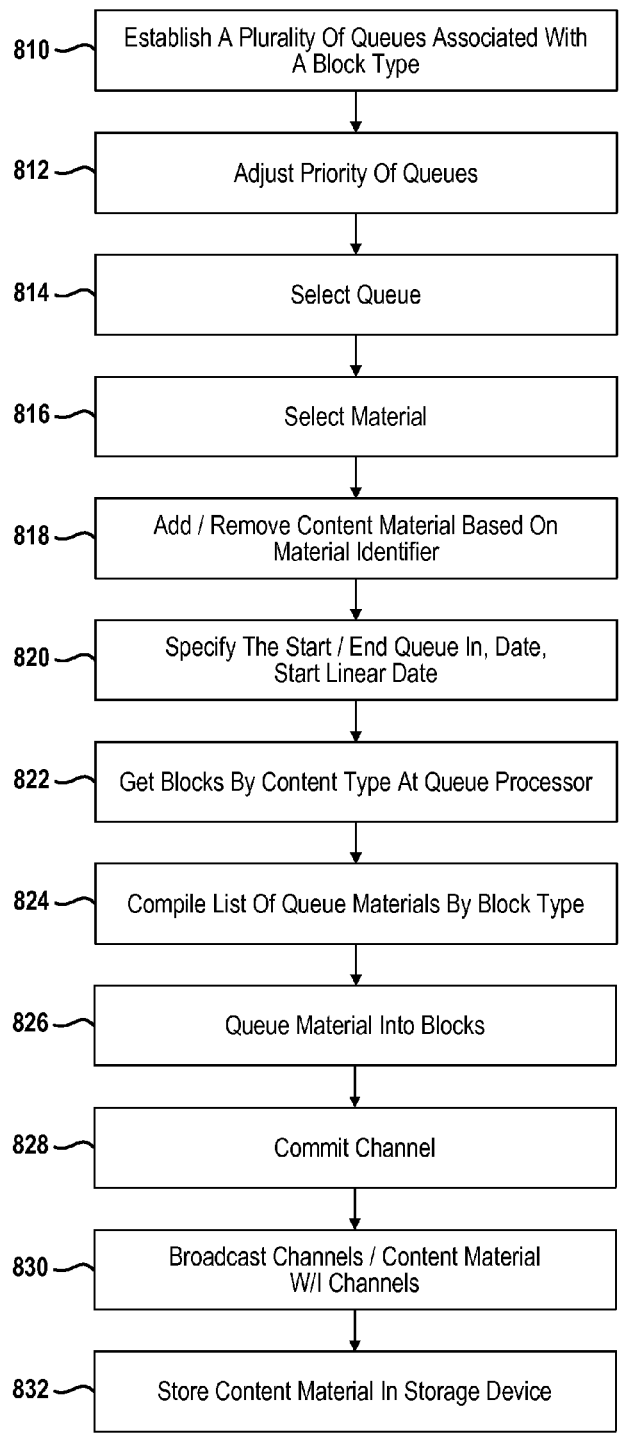
FIG. 9 is a flowchart of a method for operating the auto scheduler.

Referring now to FIG. 9, a method for scheduling content titles within a channel block is set forth. In step 810, a plurality of priorities with associated block types is provided. As mentioned above, different high-definition and standard-definition blocks may be provided. Peak and non-peak, as well as different MPEG formats, may also be associated with a priority. The priorities may also be associated with a predetermined content type. For example, trailers may have a different content type than movies and welcome videos. Different group types may be scheduled into different types of channel blocks. The user interface associated with the device may allow the system operator to specify the priority based merely upon the type of material to be scheduled. As an example, trailers may have a certain type of priority. As is described herein, the prioritization may have to do with the frequency or size of the block. Higher priority channel blocks may have more space available. Blocks may be setup for prime time or peak periods and off prime or non-peak periods. Non-peak periods for broadcasting may correspond to a higher chance of successful delivery to the user device since tuner conflicts at the specific set top boxes are less likely during such times. Content may be assigned to non-assigned blocks.

In step 812, the bandwidth associated with the priorities may be adjusted by the operator through the user interface. In step 814, a priority is selected by the operator. In step 816 a material is selected for the priority. In step 818, the content may be stored within the system, associated with the priority. The content may be merely stored by providing a material identifier and associating it with the priority. In step 820, a start time, queuing date, linear start date and the like may also be assigned to the material that is associated with a priority. In step 822, blocks may be obtained by the material scheduler based upon the content type. In step 824, a list of the prioritized materials may be provided by block type. In step 826, the materials may be scheduled into blocks. The blocks used may be uncommitted or unassigned blocks. A schedule is committed to the channel in step 828. In step 830, the channels are broadcasted with the various material, corresponding to the schedule created from content material in the priority queue. The schedule manager may repeatedly broadcast the content in a carousel-like fashion to the user devices based on a cycle time for the content and priority queue. In step 832, the content material broadcasted through the channels of the communication system is stored after being received by the user device. The content material may be stored in different ways depending how the block is provided. For example, the content material may be stored within a network partition if it was not requested specifically by a user, for push content. The content may be stored in a user partition if it was requested by a use, for carousel content.

Movie content material may be classified as being VOD (non-linear) or PPV (linear) depending on the display date and the delivery method. VOD content allows an earlier display window, with different revenue splits, for studio payments. The linear start date described in 820 defines the point in time where material is classified as linear, for the linear PPV split. Before that time, the movie content material is classified as non-linear, for the non-linear VOD split.

Figure 10:
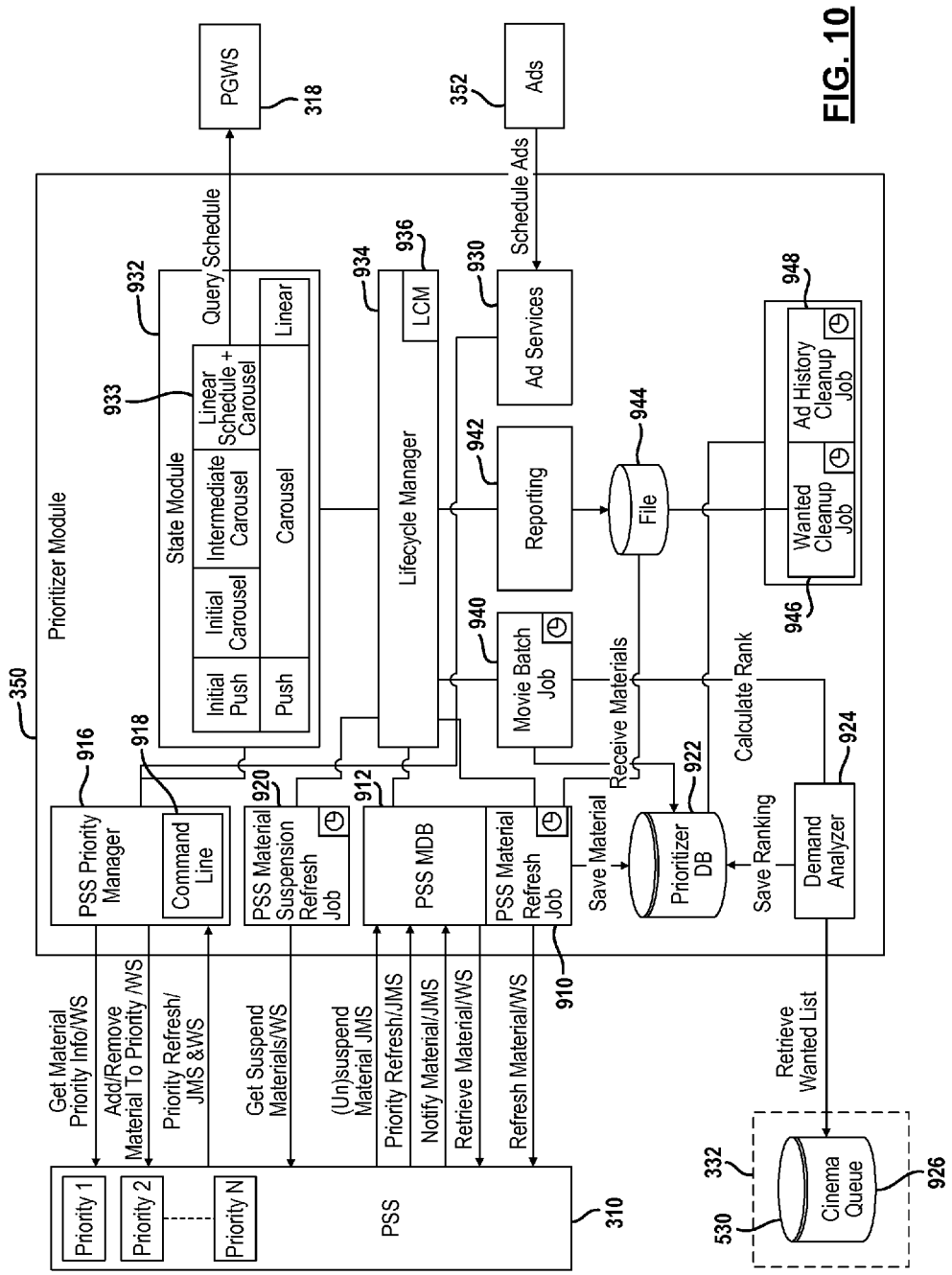
FIG. 10 is a detailed block diagrammatic view of the prioritizer module illustrated in FIG. 2.

Referring now to FIG. 10, a detailed block diagrammatic view of the prioritizer module is set forth. The following description is provided using Java technology. However, various programming languages may be used.

The prioritizer 350 is in communication with various modules of the content processing system 102. The prioritizer 350 is in communication with PSS 310. The prioritizer includes a PSS material refresh job module 910 and a PSS message-driven bean (MDB). A message-driven bean is an enterprise bean that allows Java applications to process messages asynchronously. The message-driven bean acts as a JMS message listener. The prioritizer 350 receives a notification of new material or updates of existing material from the PSS 310 at the PSS MDB 912. The notification may include a content identifier and the type of notification such as new, update or remove. The notification received from the PSS 310 may be a Java messaging service (JMS) notification. The prioritizer 350 using the PSS MDB 912 may retrieve various data from the PSS 310 for the addition or update. The data may include a Tribune Media Services® (TMS) identifier, a material identifier, a content category which in the present example has six basic categories: category 1, category 2, category 3, category 4, category 5 and category 0. The type of material such as an ad, movie, trailer, or welcome video, the format of the video such as 480p, 720p, 1080p, 1080i, 3D, whether the format is A3, whether the format is standard definition, the rights date start, the rights date end, the linear start date, the title, and an advertisement (ad) identifier, if appropriate. Of course, other types of identifiers may be provided in the data. When the PSS MDB 912 receives a notification, it calls a PSS web service to retrieve the material metadata and executes an appropriate material-type handler based on the material type and the type of notification.

The prioritizer 350 includes a push scheduling system (PSS) priority manager module (priority manager) 916 that includes a command line tool 918, a PSS material suspension refresh job 920, and a PSS message-driven bean (MDB) 912. The push scheduling system 310 provides priorities (Priority 1 through Priority N) for which the prioritizer 350 uses to schedule content material. The material associated with the priorities is scheduled onto broadcast channels as described above. Content material includes a material ID used for scheduling. The priority manager 916 adds, removes, or updates materials associated with the PSS priorities. Attributes about the priorities, such as the number of materials associated with each priority may also be obtained by the priority manager 916. The priority manager 916 may utilize the attributes to intelligently place content material within the PSS system. Whenever there is a change in the PSS system, such as the available priorities, the PSS may notify the prioritizer so that the prioritizer may refresh the available priorities in its cache.

The material suspension refresh job 920 may suspend materials when a material override notification is received. By suspending the material, the prioritizer 350 may no longer manage the content material and upon an unsuspend material signal from the PSS, the prioritizer may unsuspend the material. This will cause the material to be actively managed by the prioritizer 350.

The prioritizer 350 may include a prioritizer database 922. The prioritizer database 922 may save materials received from the PSS MDB 912. A ranking may also be saved within the prioritizer database 922 that is received from a demand analyzer 924. The demand analyzer 924 obtains raw cinema wanted list data from the cinema queue database 530 disposed within the cinema queue application 332 as described above. The wanted list data for each movie for all customers may be aggregated. The demand for each content may be determined. The data such as the ranking may be used to change the priority of movie content. For example, the demand data may be used to set the movie content priority.

One or more variables may be used for calculating the demand of each movie title. The variables may include the frequency of the appearance of all material across all wanted lists, the total number of persons having the material in their wanted list, the cinema queue rank weight, a frequency appearance weight, the maximum number of items on the wanted list, the number of items on any one of the person's wanted list, the ranking within the wanted list, a weight of each item within the wanted list, an adjusted weight, a total weighted rank for each of the persons, a frequency rank and a wanted list demand rank.

The variables may also include the frequency of purchasing or viewing of material recorded from a wanted list, the total number of persons purchasing or viewing the material, the frequency of successful recordings from a wanted list after one, two, three days, etc. and the frequency and total number of purchases of such recorded material, the frequency and total number of purchases of wanted list material having different priority assignments, the computed purchase rank and weighted purchase rank, and a purchase demand rank. Various other factors may also be incorporated into the determination of a demand for each content title.

Based on the calculated demand, the demand analyzer 924 may determine the current rank. In addition, since historical daily demand information may be kept, the demand analyzer may determine the moving average rank. The higher of the current rank or moving average rank may be used to determine the priority of a material.

When the content material is in the carousel state, the rank is provided by the demand analyzer 924. When determining the rank of content material, the demand analyzer 924 may look up the material based on the material ID. If the demand analyzer 924 cannot find the material ID in the cinema queue 530, it may try a combination of the Tribune Media Services® (TMS) ID+Format. If none of the combination works, the demand analyzer 924 will try the TMS ID alone last. In the cinema queue 530, possible formats are: HD, SD, 1080p, 3D, and null. However, the data from PSS 310 may have formats other than 1080p such as 720p or 1080i. For this reason, the following rule may be used to look up the rank of a material:

a. if the movie is SD (HD and 3D flags in prior materials table are false), the rank using TMS_ID+SD may be used first, followed by second try with just TMS_ID b. if the movie is 3D (3D flag in prior materials table is true), look up the rank for TMS_ID+3D first, followed by second try with just TMS_ID c. if HD and 3D flags in prior materials table are true, see b.

d. if movie is HD (HD flag is true and 3D flag is false in prior materials table) and format is 1080p, look up the rank for TMS_ID+1080p first, followed by second try with just TMS_ID e. if movie is HD (HD flag is true and 3D flag is false in prior materials table) and format is not 1080p, look up the rank for TMS_ID+HD first, followed by second try with just TMS_ID The ads module 352 may be in communication with the prioritizer 350. The ad module 352 may be in communication with an ad services module 930. The ads module 352 provides a request to schedule unscheduled ads on the queues within the PSS 310. Thus, the ad services module 930 is in communication with the PSS priority manager 916. The DLS or ad sales may provide the metadata for the ads. The ads module 352 may decide whether the ads are scheduled or unscheduled.

The state module 932 is in communication with a lifecycle manager module (lifecycle manager) 934. The lifecycle manager 934 may initiate and manage the lifecycle of the various content material. A lifecycle may be composed of one or more states where an active content is processed. Content material may be in one of five overall statuses:

A. Initial (I)—a material is ready to be processed by the lifecycle manager 934.

B. Active (A)—a material is actively managed by the lifecycle manager 934.

C. Error (E)—lifecycle manager 934 encountered an error during processing and will stop processing this material.

D. Complete (C)—a material has completed processing through its lifecycle.

E. Suspended (S)—the active management of a material via prioritizer 350 is suspended.

The lifecycle manager 934 initializes content materials to lifecycles based on the content material type and category. Next, the appropriate lifecycle is managed at the lifecycle state module 934 to handle the content material and the lifecycle. When the state processing is complete, it returns the result to the lifecycle manager which then determines to continue processing with the next state. At the end of a content material lifecycle, the material is kept until a delete JMS notification is received by PSS MDB 912 from the PSS 310. Currently, the possible results of processing material at each state are:

A. Previous—the material will be processed at the previous state.

B. Current—the material will still be processed at the current state.

C. Next—the material has finished processing at the current state and may be moved to the next state.

D. End—the material has finished its lifecycle.

E. Error—there was an error in processing the material and the processing should stop.

Part of the lifecycle manager 934 is a component called lifecycle configuration manager (LCM) 936. LCM 936 manages the configuration of lifecycles and states. The LCM 936 also reads configurations from a lifecycle configuration file. The lifecycle configuration file may be used to generate Java binding files via Java architecture for XML binding (JAXB). If a new state is added, the lifecycle configuration file is configured with the new state. If additional configurations are used, Java binding files may be rapidly generated with JAXB. This process simplifies and speeds up the development process of lifecycles and states.

Lifecycle manager 934 may be used by other components to suspend or reactivate the processing of a material.

The state module 932 contains logic to process content materials. Through the various states which are part of a lifecycle, the state module 932 will only process materials if it is determined to be a state valid for the content material. Each state may be reused across several lifecycles and may have a different configuration for each lifecycle. The configuration is passed to each state by lifecycle manager 934. When the lifecycle manager 934 calls upon a state handler 933 of each state to process a material, the lifecycle manger passes along the material, a hashmap of configuration and data that may be utilized by the state handler 933. Several state handlers 933 are illustrated for different states as will be discussed below. The configuration may include the following data:

A. The state's lifecycle ID. (key="lifecycle id")
B. The state's state object which specifies the specific state configurations. (key="state")

In the present example, there are two types of states: primary state and composite state. Examples of a primary state include carousel, push, time overlap validation, linear, linear schedule carousel, ad, and end. Composite states may include one or more primary states.

During a transition between a push and carousel state, a configuration is used to specify a time period to wait before a material may be scheduled on the push scheduling system 310. This may be specified in both the push and carousel.

The first state described is a time overlap validation state. Since each state is time sensitive and the moving of materials from one state to the next state is dictated by time, the time overlap validation state validates that for a given material, no states within the lifecycle overlaps in time. If there is an overlap, an error result is returned to the lifecycle manager 934 which will log an error and stop processing of the material.

The composite state is a state used where there is a possibility of multiple states that need to be processed at the same time.

The Push State places materials on the PSS 310 with a push priority.

The carousel state uses the demand calculated by the demand analyzer to prioritize movies.

In the linear schedule state (i.e. do nothing state), nothing is placed on the PSS 310. Essentially, the system does nothing since the content material is broadcasted on a linear schedule rather than pushed through the PSS 310.

In the linear schedule carousel state content material is placed on the carousel for the days the material is not on the linear schedule. It calls a PGWS 318 (passing the content material identifier (e.g., TMS ID)) to obtain a list of movies on the linear schedule. The list of movies is filtered based on a format in order to find the content material matching the content material identifier. Finally, it verifies the dates when the material is not scheduled, so the content material may be carouseled. To carousel, it uses the demand calculated by the demand analyzer 924 to prioritize movies.

As mentioned above, the categories may have a lifecycle with various states associated therewith. The states are useful for various types of content including, but not limited to, movies.

The PSS priority manager 916 may be a stateless session bean which manages the priorities available in PSS. It maintains a local in memory cache of priorities available on PSS which is loaded on demand if empty or reloaded as requested by any other component such as the movie batch job 940. At times when a priority is dynamically added/deleted from PSS and in this case, PSS will send a priority refresh notification via JMS to PSS priority manager 916. At this point, the PSS priority manager 916 will reload the cache by making a web services call to PSS to obtain a list of all available priorities. If problems occur when communicating with PSS when retrieving a list of latest available priorities, the PSS priority manager will continue to use the current cached priorities. The cache is a hashmap where the key may be formed using the following convention:

Material type +","+isA3+"," +isSd and the value is composed of a two dimensional list where the first dimension may be ordered by the "desired cycle time" (the index indicates priority) and the second dimension is ordered by "schedule ahead hours."

When a state requests the PSS priority manager 916 to schedule a material, the state may provide the material, the priority, and whether for push or carousel. Based on the material, PSS priority manager 916 may extract from the hashmap the corresponding two-dimensional list. Utilizing the first dimension of the list and the priority provided by the state, the PSS priority manager 916 may obtain the list in the second dimension. The PSS priority manager 916 may traverse through the list in reverse and attempt to find a priority based on the queue priority, schedule ahead hours, supports push, supports carousel, and support 3D. If it finds no matching priorities, it will attempt to do the same with the next lower priority. If a search in all lower priorities is exhausted with no match, it will attempt to do the same for the higher priorities starting from the original priority.

Given a material and its priority, the PSS priority manager 916 determines which priority the material is associated with. It may also move content material from one priority to another as necessary. When it adds content material to PSS and associates it with a priority, it also needs to provide PSS with an effective start and end date of the content material. In some cases, it may be necessary for the PSS priority manager 916 to split the effective time period in order to promote or demote a material due to changing priority. In order to promote/demote the correct instance of the content material, the PSS priority manager 916 keeps track of the instance. Later, the PSS priority manager 916 may promote/demote/delete the instance as necessary.

If there are any problems scheduling materials on PSS, the PSS priority manager 916 will retry a configurable number of times awaiting a configurable number of minutes each time. These configurations are specified in the prioritizer properties.

The PSS priority manager persists information about each material scheduled on PSS in the database table PRIOR_PSS_ QUEUE.

Part of the PSS priority manager 916 is the command line tool 918 used to request a refresh of the materials scheduled on PSS. Essentially, this means from the command line, a user may type in a command which calls a method on PSS priority manager. This method will compare the items in the Prior_PSS_Queue table with the items schedule on PSS. A check may be performed to determine whether all items in Prior_PSS_Queue table are also present in PSS. If any items are missing, they may be added to the PSS manually.

The prioritizer 350 may also include the movie batch job module 940. The movie batch job module 940 may be in communication with the lifecycle manager 934 and the prioritizer database 922. The movie batch job module 940 may be a quartz job that runs at a preconfigured schedule. The movie batch job module 940 calls the demand analyzer 924 to calculate the last demand for movies followed by a call to the PSS priority manager 916 to obtain the latest cache. The lifecycle manager 934 is also called to process all active content such as movies throughout their lifecycles.

A reporting module 942 is in communication with the state module or the lifecycle manager, or both. The reporting module 942 may generate a file 944 that is also in communication with the PSS MDB module 912. The file 944 may also be in communication with a wanted list clean-up job module 946 and an ad history clean-up job module 948. The wanted list clean-up job module 946 may be used to clean up the cinema queue to delete entries from the prior wanted list and prior demand tables after a predetermined number of days. The ad history clean-up job module 948 deletes advertisements that are older than a predetermined number of days from a history table.

Figure 11A:
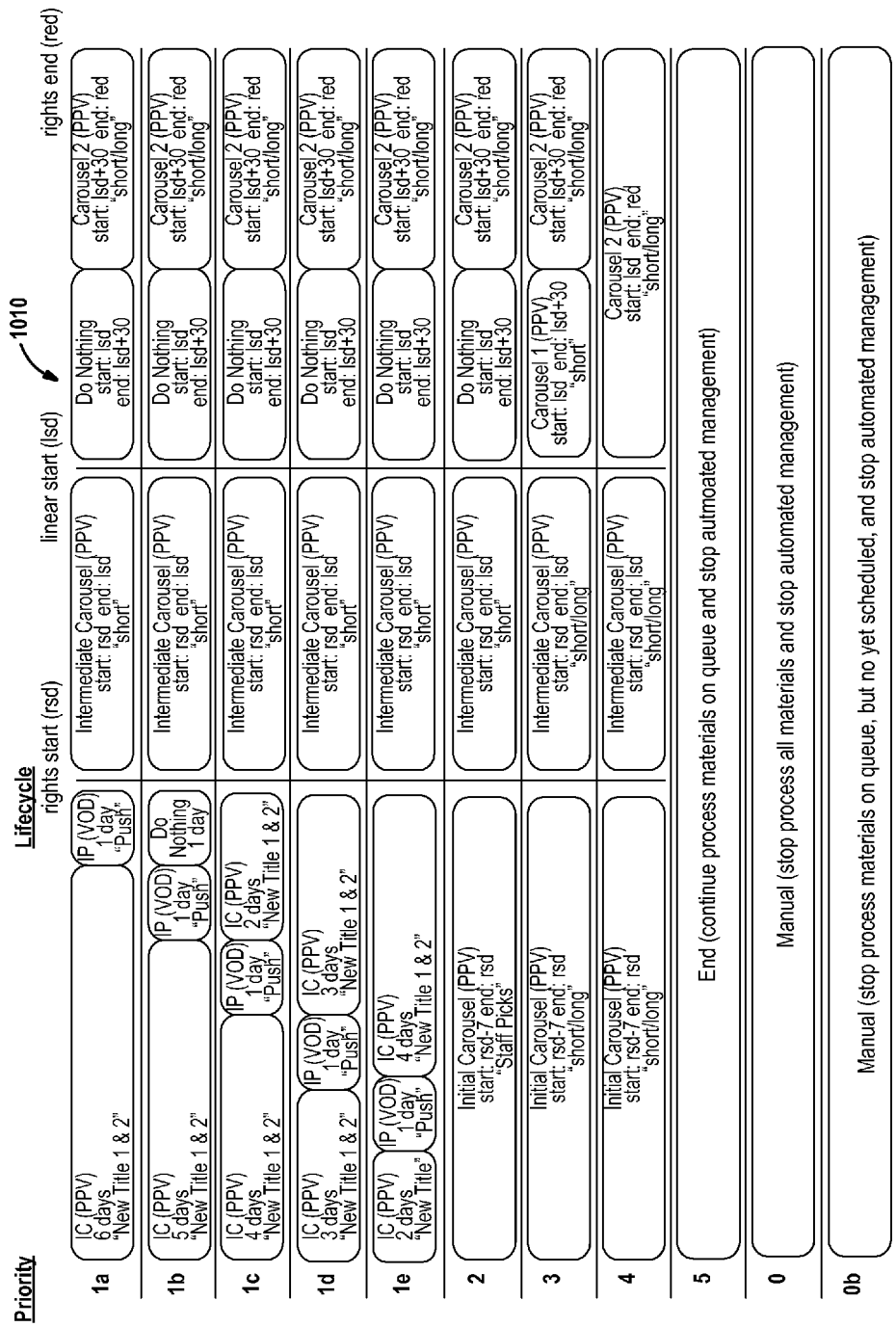
FIG. 11A is a first example of eleven lifecycles in eleven different content categories.
Figure 11B:
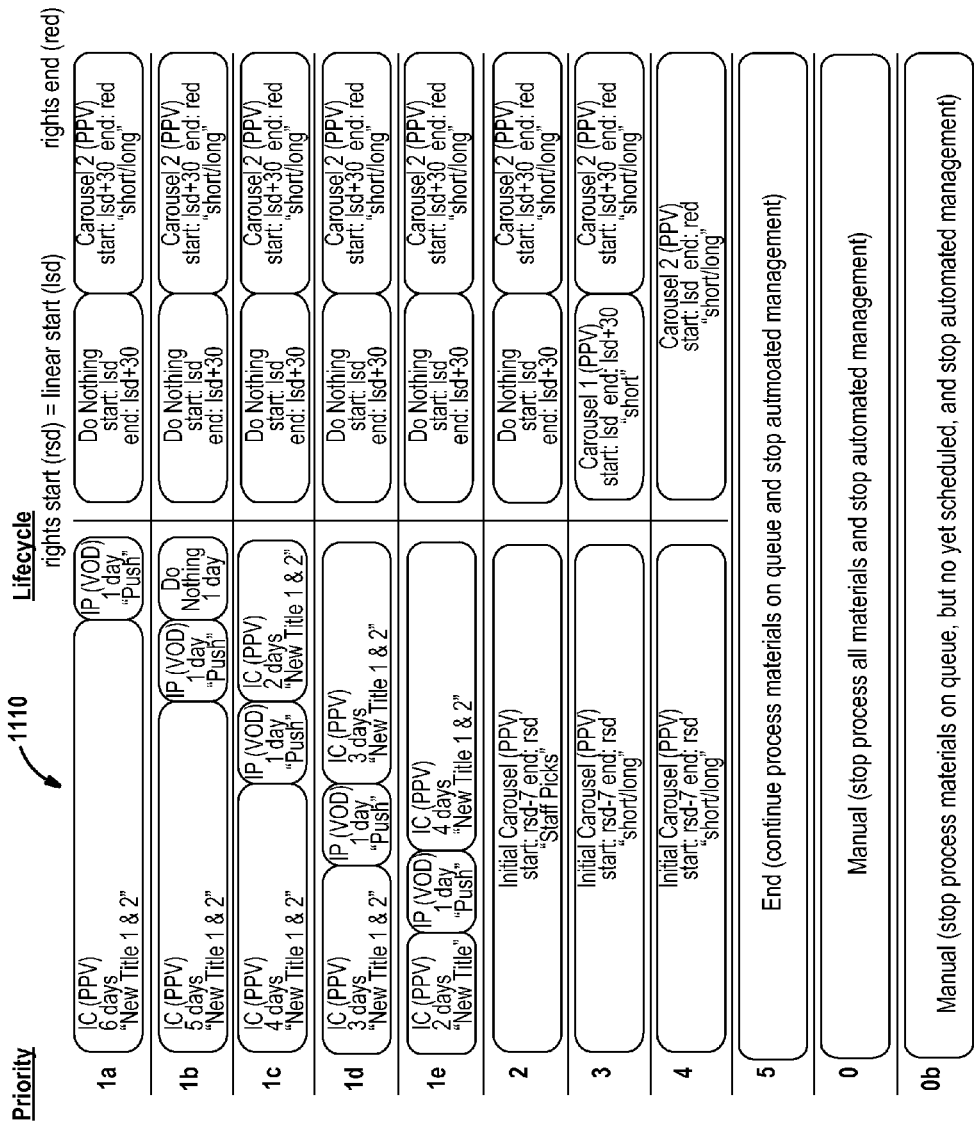
FIG. 11B is a second example of eleven lifecycles in eleven different content categories.

Referring now to FIG. 11A, an example of a lifecycle 1010 having various categories is illustrated. As mentioned above, the categories may be provided by various sources including a studio, producer of the content, or a distributor of the content. The categories may be received in metadata received at the content distribution system 102. Each category may be different or similar in various ways. In FIG. 11A, the rights start date and the linear start date are different dates. In FIG. 11B, they are the same. In category 1, there are initial carousel 7 days before the right start and the priority is New Title 1 & 2 which may correspond to a high cycle rate. Also prior to the rights starting time, the initial push date is 1 day before the rights start date and the priority is push, which may also correspond to a high cycle. After the rights start date, is the intermediate carousel with a priority of short. After the linear start date, the content is moved to a linear schedule also known as do nothing and a carousel pay-per-view starts 30 days after the linear start date. As the various time conditions are met, the materials move from one cycle state to the next cycle state until it reaches the end of the lifecycle. At the end of the lifecycle, the material may be marked complete by the lifecycle manager.

In category 2, the initial carousel date begins 7 days before the rights start date with a Staff Pick priority which may correspond to a high cycle. After the rights start and before the linear start date, the intermediate carousel state is used with a short priority. After the linear start date, the linear schedule is performed (wherein PSS does not perform active scheduling for the material) then a carousel 2 date start 30 days and a pay-per-view carousel starts using priority determined by demand analyzer.

In categories 3 and 4, the time before the right start date and the linear start date are the same as a category 2 content. However, after the linear start date category 3 uses a carousel 1 stage for a predetermined amount of time then after 30 days from the linear start date uses a carousel 2 state.

In category 4, after the linear start date, the carousel pay-per-view cinema queue is used. Other categories may also be used. Category 5 and category 0 may also be used. Category 5 may correspond to an end process. Category 0 may correspond to a manual process for stopping the processing.

Referring now to FIG. 11B, a lifecycle 1110 that has the same rights start date and linear start date is illustrated. In this example, all categories are the same as FIG. 11A, a lifecycle 1010 except that the rights start date and linear start date are the same and thus eliminating the intermediate carousel from categories 1, 2, 3, and 4.

Referring now to FIG. 12, a method of adding new material from the PSS 310 is illustrated. In step 1310, a notification may be received from the PSS at the prioritizer that new content is available. The content metadata from the PSS may be communicated to the prioritizer from the PSS after a query is generated by the prioritizer in step 1312. After step 1318, step 1224 is performed.

In step 1224, if the content is a priority 1 category and lifecycle priority 1 is assigned in step 1226, an initial carousel state is performed in step 1228. In step 1230, whether the time corresponds to a next state is determined. If the system is to execute the next state, step 1232 initiates an initial push state. After the initial push state, it is determined whether or not the next state is to be executed in step 1234. After step 1234, if the next state is to be executed, step 1236 is performed which executes the initial carousel state. In step 1238, it is determined whether or not a next state is to be executed. After step 1238, if the next step is to be executed, an intermediate carousel state is performed in step 1240. After step 1240, it is determined whether or not to execute the next state in step 1242. If the next state is to be executed, step 1244 executes a do nothing state. After step 1244, it is determined whether the next state is to be performed in step 1246. If the next state is to be performed in step 1246, step 1248 executes a carousel 2 state. If the next state is not to be executed after steps 1230, 1234, 1238, 1242, and 1246, step 1220 is performed. Step 1220 is also performed after executing the carousel state 1248.

Referring back to step 1224, if the priority category is not priority 1 category, step 1250 may be performed. If the content is priority category 2 in step 1250, step 1252 assigns a lifecycle to priority 2. After step 1252, step 1254 executes an initial carousel state. After step 1254, step 1256 determines whether to execute a next state. If a next state is to be executed after step 1256, step 1258 is performed which executes an intermediate carousel state. After the intermediate carousel state, step 1262 determines whether to execute the next state. If the next state is to be executed after step 1262, step 1264 executes a do nothing state. After step 1264, it is determined whether a next state is to be executed step 1266. If a next state is to be executed in step 1266, step 1268 executes a carousel 2 state. After step 1268, step 1220 is performed. After steps 1256, 1262, and 1266, if a next state is not to be executed step 1220 is performed which ends the process.

Referring back to step 1250, when the content is not priority 2 category, step 1280 determines whether the content is priority 3 category. If the content is priority 3 category, step 1282 assigns a lifecycle priority 3 to the content. After step 1282, step 1284 executes an initial carousel state. After step 1284, it is determined whether a next state is to be executed in step 1286. If a next state is to be executed, step 1288 executes an intermediate carousel state. After step 1288, step 1290 determines whether or not a next state is to be executed. If a next state is to be executed, step 1292 executes a carousel 1 state. After step 1292, step 1294 determines whether a next state is to be executed. If a next state is to be executed, step 1296 executes a carousel 2 state. After step 1296, step 1220 is performed. After steps 1286, 1290, and 1294, if the next state is not to be executed, step 1220 ends the process.

Referring back to step 1280, step 1300 determines whether the category is a priority 4 category. If the category is a priority 4 category in step 1300, step 1302 assigns a lifecycle priority 4 to the content. After step 1302, step 1304 executes an initial carousel state. After the initial carousel state is executed, step 1306 determines whether a next state may be executed. If the next state is to be executed, step 1308 executes an intermediate carousel state. After the intermediate carousel state in step 1308, step 1310 determines whether the next state is to be executed. If the next state is to be executed in step 1310, step 1312 executes the carousel 2 state. After step 1312, the process ends in step 1220. Also, the process ends when the next state is not to be executed in steps 1306 and 1310.

Referring back to step 1300, if the category is not a priority 4 category, step 1320 is performed. Step 1320 determines whether the priority is a priority 5 category. If the category is a priority 5 category, step 1322 is performed which assigns a life cycle for priority 5. After step 1322, step 1324 ends the execution of the state and step 1220 is performed.

In step 1320, if the priority is not a priority 5 category, step 1330 is performed. In step 1330 it is determined whether the priority is a priority 0 or a priority 0b. In step 1332, a life cycle of priority 0 or 0b is assigned. After step 1332, a manual state may be executed in step 1334. After step 1334, step 1220 may be performed.

After step 1330, step 1340 is performed if the priority is not a priority 0 or 0B. In step 1340, a log error is generated.

Figure 13:
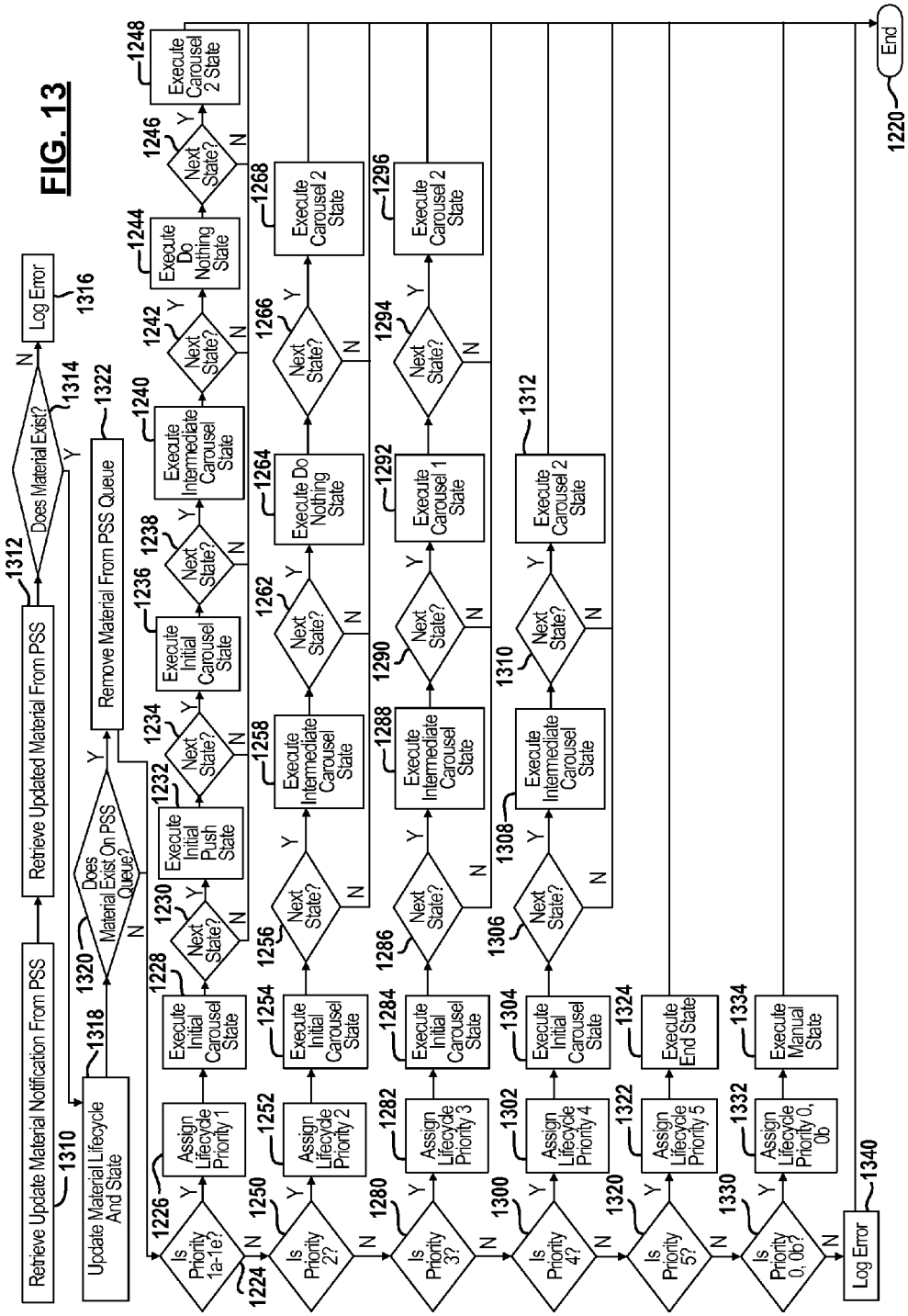
FIG. 13 is a flowchart of a method for receiving updated material from the listing service.

Referring now to FIG. 13, a method for receiving updated material from the PSS is illustrated. In step 1310, content material notification is received at the prioritizer from the PSS. In step 1312, the updated content material, such as the metadata, is received from the PSS. After step 1312, step 1314 determines whether the content material exists. If the content does not exist, step 1316 generates a log error and the process ends in step 1220. In step 1314, if the content does exist, step 1318 updates a content lifecycle and state. After step 1318, step 1320 determines whether the content exists on the push scheduler system 310. If the content does exist on the push scheduler system 310, step 1322 removes the content from the PSS 310, after which step 1224 is performed.

After step 1320, if the content does not exist on the PSS, then step 1224 is performed. The remaining steps of FIG. 13 from steps 1224 are identical to those in FIG. 12 and are thus labeled the same.

Referring now to FIG. 14, a method for deleting content material from the prioritizer is set forth. In step 1410, a delete content material message may be received from the PSS at the prioritizer. In step 1412, if the content material does exist in the prioritizer, step 1414 deletes the content material from the prioritizer. If the content does not exist in the prioritizer and after step 1414, step 1416 ends the process.

Figure 15:
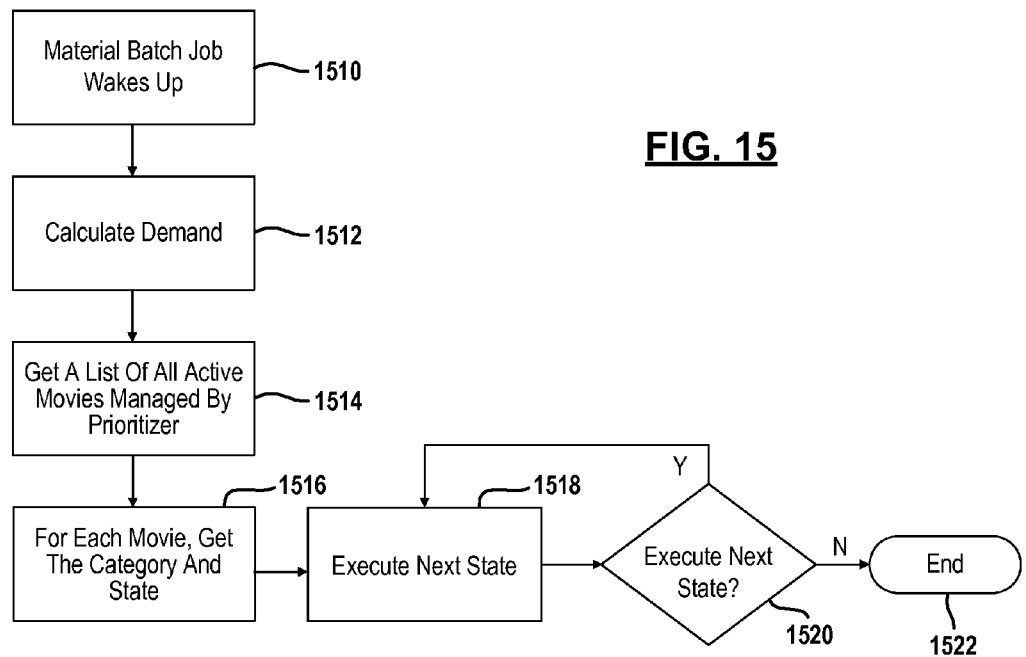
FIG. 15 is a flowchart of a method for performing a movie batch job.

Referring now to FIG. 15, a method for performing a movie batch job is illustrated. In step 1510, the movie or content material batch job wakes up. After step 1510, step 1512 calculates a demand for the content. Demand may be calculated in various ways based on feedback from the customer's set top boxes. This may be performed on a periodic basis by the set top box periodically recording the events and data to the head end. This may include titles in a wanted list, when they are recorded and when they are purchased. This will be further described in FIG. 19. Step 1514 gets a list of all active movies (or other) content managed by the prioritizer. After step 1514, step 1516 gets the category and state for each movie. After step 1516, the next state is executed in step 1518. After step 1518, step 1520 determines whether the next state may be executed. When the next state is executed, step 1518 is again performed. When the next state is not to be executed, step 1522 ends the process.

Figure 16:
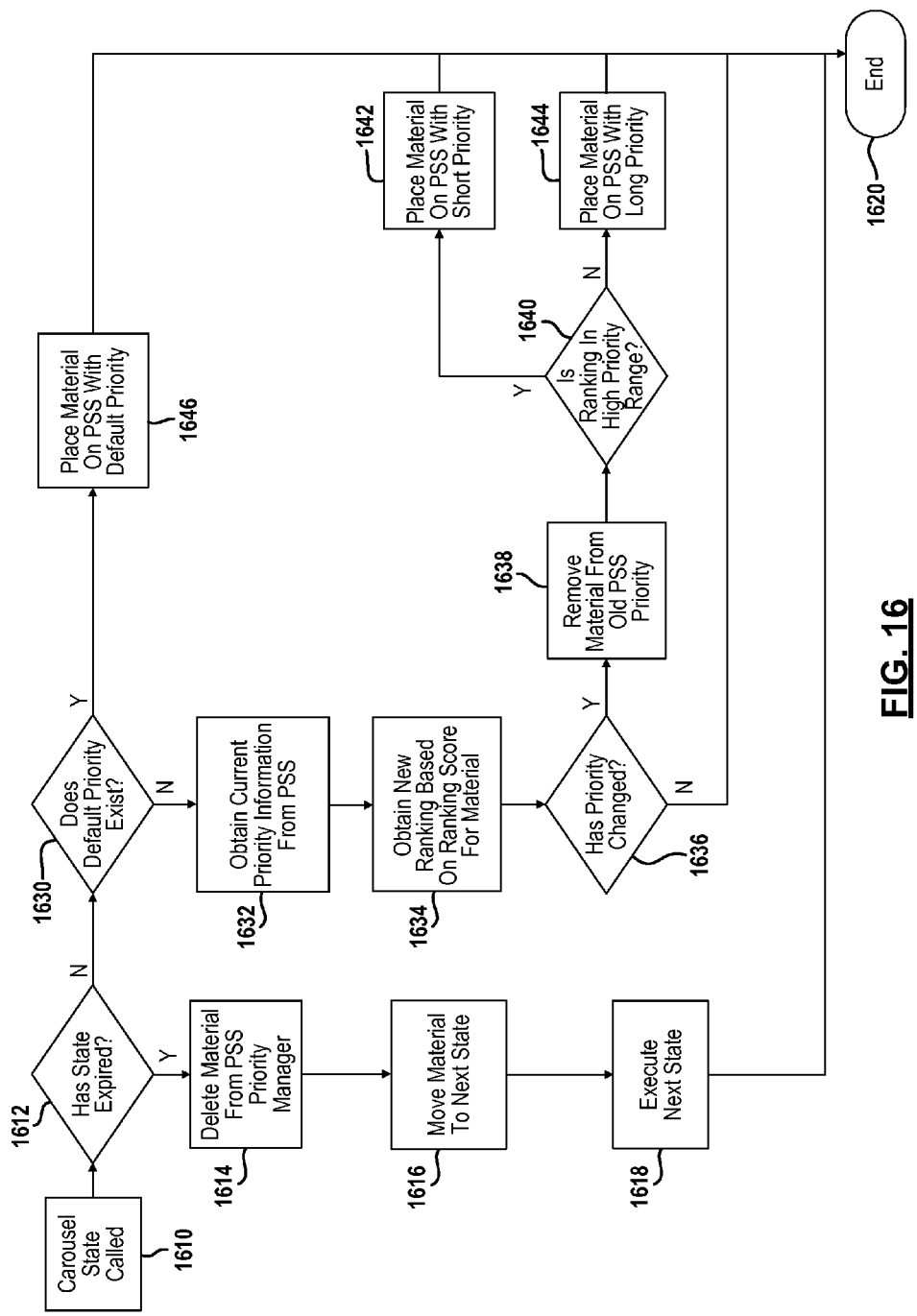
FIG. 16 is a flowchart of a method for performing a carousel state.

Referring now to FIG. 16, a method for performing a carousel state is set forth. In step 1610, the carousel state is called by the process. If the state has expired in step 1612, step 1614 deletes the content material from the push scheduler priority manager. After step 1614, step 1616 moves the content material to the next state. In step 1618, the next lifecycle state is executed. Thereafter, step 1620 ends the process.

Referring back to step 1612, when the carousel state has not expired, step 1630 is performed. In step 1630, it is determined whether a default priority exists. If the default priority does not exist, the current priority information is obtained from the push scheduler system in step 1632. After step 1632, step 1634 obtains a new ranking based on the ranking based on the ranking score for the material. After step 1634, step 1636 determines whether the priority has changed. If the priority has not changed step 1620 ends the process.

In step 1636, if the process or the priority has changed step 1638 removes the material from the old push scheduler priority. After step 1638, step 1640 determines whether the ranking is in a high-priority range.

When the ranking is in a high-priority range, step 1642 associates the material with a short priority PSS priority. After step 1642, step 1620 ends the process.

Referring back to step 1640, if the ranking is not in a high-priority range, step 1644 a associates the material with a long priority PSS priority. After step 1644, step 1620 ends the process.

Referring back to step 1630, when the default priority exists, step 1646 places the content material on a default PSS priority.

Figure 17:
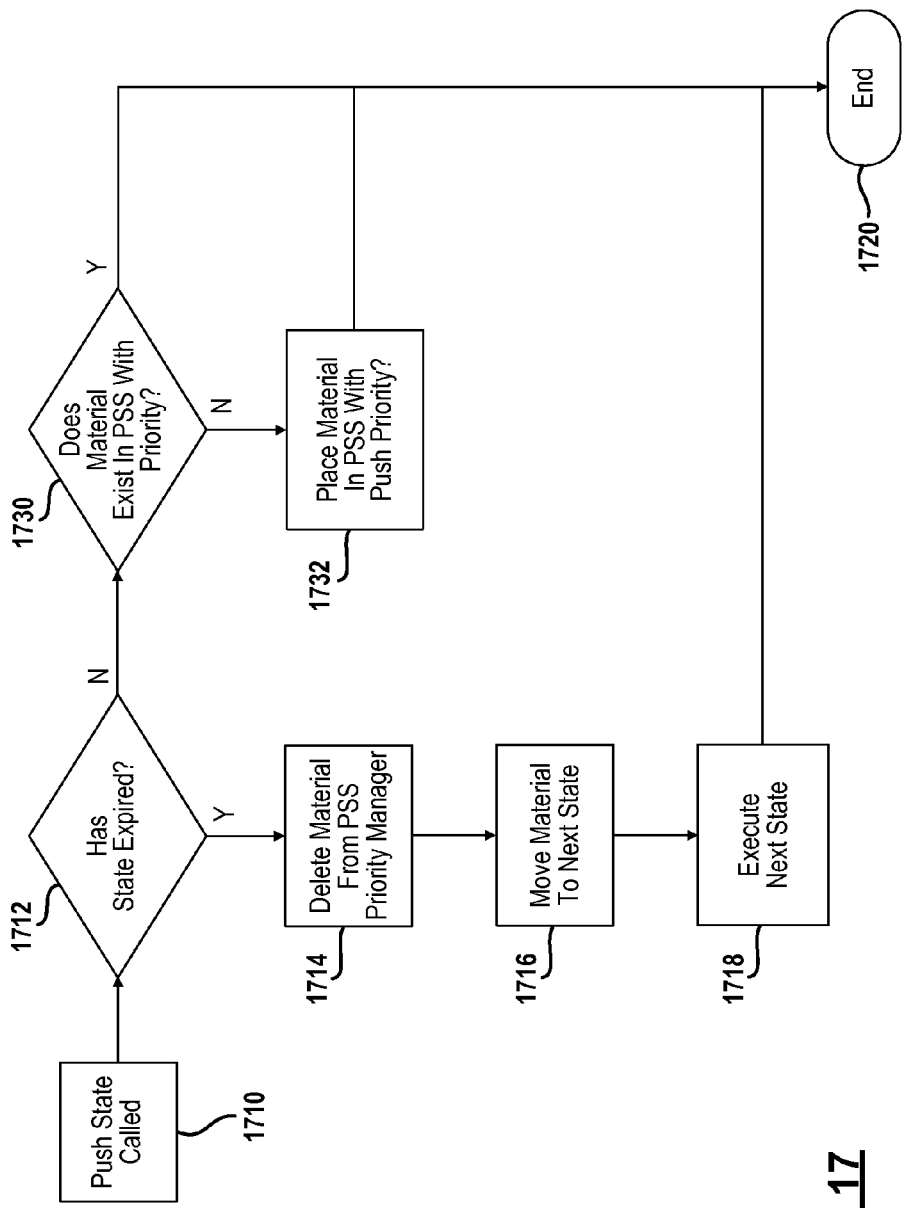
FIG. 17 is a flowchart of a method of performing a push state.

Referring now to FIG. 17, a method of performing a push state is set forth. When a push state is called by the lifecycle manager, step 1710 is performed. After step 1710, it is determined whether the push state has expired in step 1712. If the push state has expired in step 1712, step 1714 deletes material from the PSS priority manager and step 1716 moves the material to the next lifecycle state. In step 1718, the next lifecycle state is executed. After step 1718, step 1720 ends the process.

Referring back to step 1712, if the state has not expired, step 1730 determines whether the content material exists in PSS. If the content does exist, step 1720 is performed which ends the process.

In step 1730, if the content does not exist in PSS, step 1732 places the material on the PSS with push priority. After step 1732, step 1720 ends the process.

Figure 18:
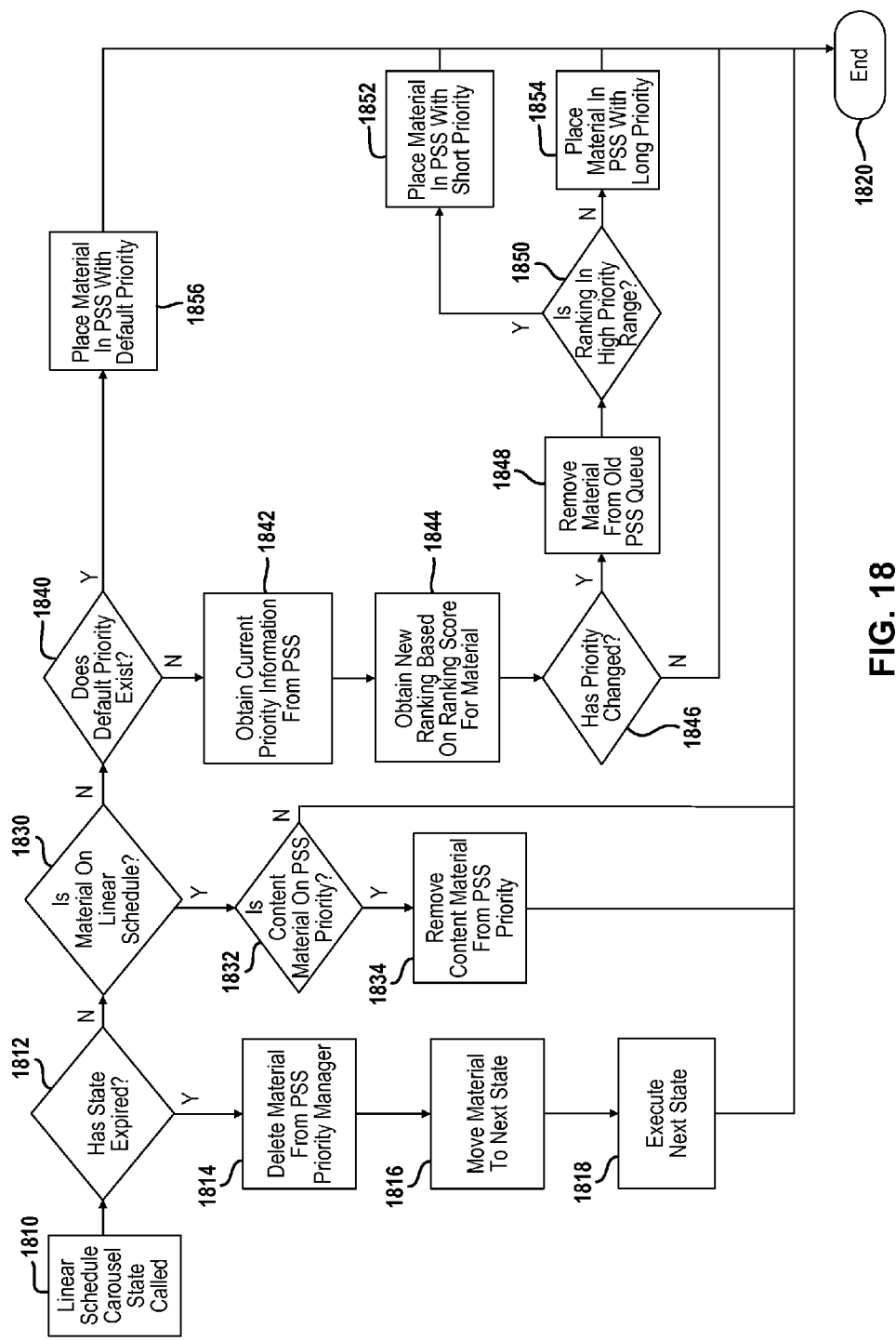
FIG. 18 is a flowchart of a method for performing a linear schedule carousel state.

Referring now to FIG. 18, a method for performing a linear schedule carousel state is set forth. When the linear schedule carousel state is called, step 1810 is performed. After step 1810, it is determined whether the state has expired in step 1812. If the state has expired in step 1812, step 1814 deletes the content material from the PSS priority manager. Thereafter, step 1816 moves the content material to the next state. After steps 1816, the next state is executed in step 1818. After step 1818, step 1820 is performed.

Referring back to step 1812, if the linear schedule carousel state has not expired, step 1830 determines whether the content material is on a linear schedule. If the content material is on a linear schedule, step 1832 determines if the content material is scheduled on the PSS. If the content is scheduled on the PSS in step 1832, step 1834 removes the content material from PSS. Also, in step 1832, if the content material is not on the push scheduler, step 1820 is performed which ends the process.

Referring back to step 1830, when the content material is not on a linear schedule, step 1840 determines whether a default priority exists. If a default priority does not exist in step 1840, step 1842 obtains the current priority information from the push scheduler. After step 1842, step 1844 determines a new ranking based upon the ranking score for the content material. After step 1844, step 1846 determines whether the priority has changed. If the priority has not changed in step 1846, step 1820 ends the process.

Referring back to step 1846, when the priority has changed, step 1848 removes the old content material from the PSS. After step 1848, step 1850 determines whether the ranking is in a high-priority range. If the ranking is in a high-priority range, step 1852 places the content material in a short-priority range in PSS. If the content is not in a high-priority range in step 1850, step 1854 places the content material with a long priority PSS in step 1854.

Referring back to step 1840, when a default priority exists, step 1856 places content material on the PSS with default priority.

Figure 19:
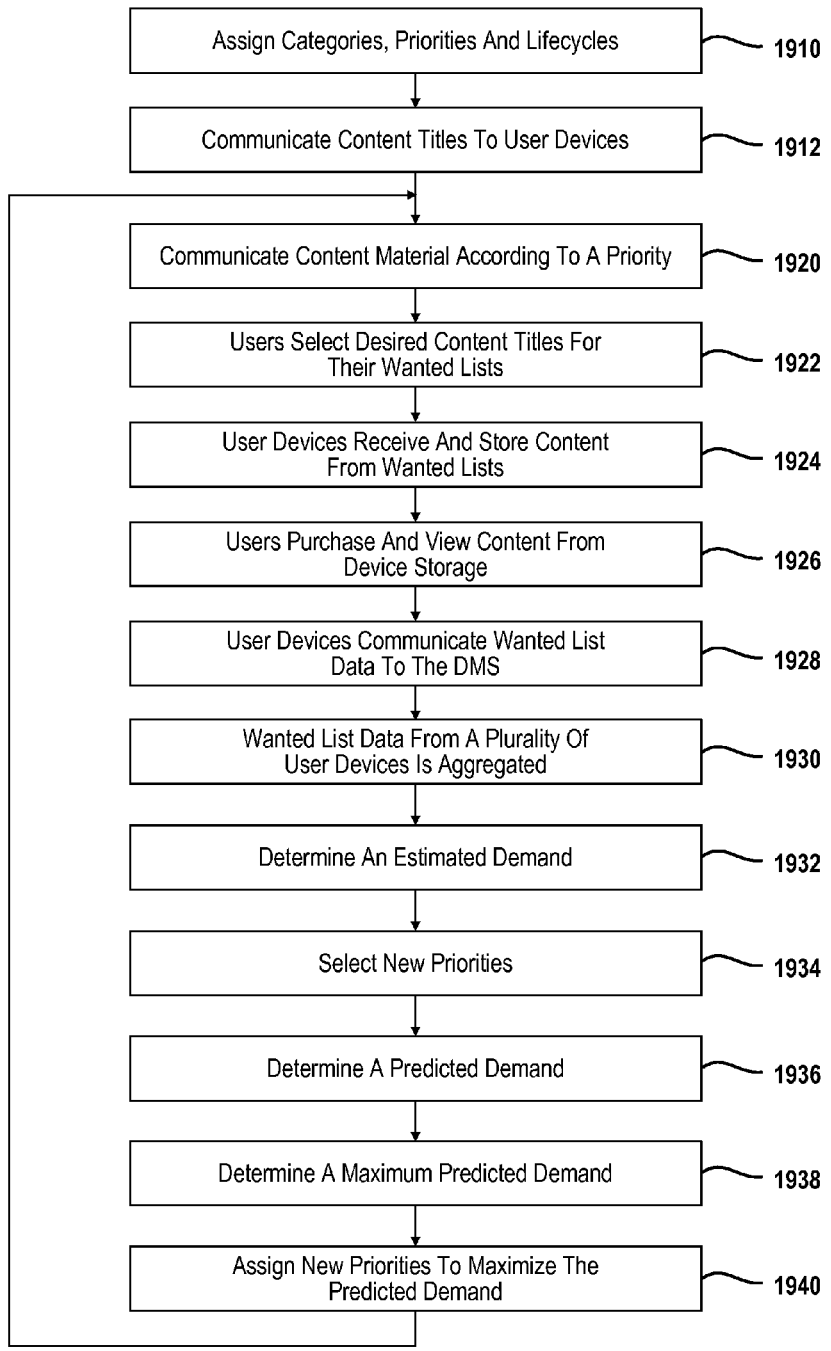
FIG. 19 is a flowchart of a method for performing a carousel optimization.

Referring now to FIG. 19, a method for providing carousel optimization is set forth. In step 1910, categories, priorities and lifecycles are established for the carousel content. In step 1912, titles of content are communicated to the user devices. The content titles may be currently available or may be available in the future.

In step 1920, content materials are broadcast via the satellite according to their assigned priority and life cycle in the carousel schedule. In step 1922, users select desired content titles for their wanted lists. In step 1924, user devices receive and store content identified in the wanted lists. The content may be stored in the storage device in a network partition portion or in a user partition portion. In step 1926, users purchase and view the stored content.

In step 1928, connected user devices communicate wanted list data to the DMS at the head end. The wanted list data may include titles of content in the user wanted list, as well as events indicating when a content title is added to the wanted list, when the content material is received and stored within the storage device of the set top box, and when the stored content is purchased and viewed by the user. The wanted list data may be communicated to the DMS at the time that the event occurs, or may be stored in the user device and communicated to the DMS on a daily, weekly or monthly basis.

In step 1930 the wanted list data at the DMS database from a plurality of connected user devices is aggregated at the head end.

In step 1932 an aggregated demand may be determined for the various content titles. The aggregated demand from connected devices may be used to estimate a demand from connected and unconnected users. An estimated demand may be calculated in various ways.

The wanted list data may be aggregated to determine an average weighted title rank for the content. Such an average weighted title rank $P(m)$ may estimate the relative popularity of a content title m, based on the frequency the title appears in the collected wanted lists. For example, $P(m)=M/W$ may be calculated as M, the number of wanted lists which include title m, as a fraction of W, the total number of wanted lists.

The purchase data may be aggregated to determine an average purchase rate and an average weighted purchase rank for the content. Such an average weighted purchase rate $Q(m)$ may estimate the likelihood that a title m in a wanted list will be purchased and viewed. The average weighted purchase rank $P^*(m)$ may estimate the relative popularity of the content title based on the frequency the title is purchased and viewed. For example, $Q(m)=V(m)/M$ and $P^*(m)=V(m)/W$ may be calculated where $V(m)$ is the number of wanted list purchases of title m.

The purchase data and wanted list data may be aggregated to determine an average carousel purchase rate. Such an average carousel purchase rate (CPR) may estimate the wanted list entries that are successfully recorded, purchased and viewed. For example, $CPR=V/W$ may be calculated, where V is the total number of purchases of wanted list titles. The carousel purchase rate can measure the effectiveness of the carousel schedule in delivering wanted titles in a timely manner resulting in purchase and viewing.

The recording data may be aggregated to determine an average recording timeline for each content title. Such an average recording timeline $R(m,t)$ may estimate the likelihood over time when a content title will be successfully recorded. For example, $R(m,t)=S(m,t)/M$ may be calculated, where $S(m,t)$ is the number of cases in the aggregated DMS database where a title m was stored to memory on the $t^{th}$ day after being added to a wanted list. The recording timeline will depend on the carousel priority as well as recording conflicts.

The recording and purchase data may be aggregated to determine an average purchase timeline for each content title. Such an average purchase timeline $Q(m,t)$ may estimate the likelihood that content recorded after various recording delays will actually be purchased. For example, $Q(m,t)=V(m,t)/R(m,t)$ may be calculated, where $V(m,t)$ is the number of cases in the aggregated DMS database where a title m is purchased and viewed, if it was recorded on the $t^{th}$ day. The purchase timeline characterizes how rapidly users lose interest a movie after adding it to their wanted list. This behavior may vary for different movies and at different times in the exhibition lifecycles.

In step 1934, a new set of content priorities may be selected. The content priorities may be chosen to match an estimated demand from the aggregated wanted list data. The content priorities may also be chosen to maximize a predicted demand, as further described below.

In step 1936, a predicted demand may be determined, based on the new priorities. The predicted demand may be calculated using the weighted rankings and likelihoods estimated from the aggregated data. The predicted demand may be calculated in various ways.

For example, the predicted demand may comprise a predicted carousel purchase rate. The carousel purchase rate is a measure of customer demand and customer satisfaction that is directly affected by the carousel priority schedule. The purchase rate may be calculated as follows.

The new content priorities will result in new predicted recording likelihoods $R'(m,t)$ for the recording timelines. These likelihoods may be estimated using the repetition frequency and time-of-day (i.e. prime-time or non-prime-time) of the movie in the carousel priority schedule and the likelihood of recording conflicts estimated from the DMS history data. Based on the previously estimated title popularity rankings $P(m)$ and purchase timeline likelihoods $Q(m,t)$ a predicted new carousel purchase rate may be computed. For example, the estimated purchase timeline and predicted recording timeline may be averaged over time to predict the title purchase rate $Q'(m)=\Sigma Q(m,t)R'(m,t)$ and these per title purchase rates may be averaged over the different movies to predict the carousel purchase rate $CPR'=\Sigma P(m)\Sigma Q'(m)$.

In step 1938 a maximum predicted demand may be determined. Steps 1932 to 1936 may be repeated a number of times, using various priority selections, to determine a set of priorities that maximizes the predicted demand. Thus, in the example, a set of priorities may be selected that will maximize a predicted carousel purchase rate.

After step 1940, the new set of priorities may be installed in the carousel scheduler, and then step 1920 and the later steps may be repeated with the new priorities.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   assigning a content category and content identifier to a content;
   communicating the content category and content identifier for the content to a prioritizer;
   associating a lifecycle having a plurality of lifecycle states with the content category;
   assigning a first priority to the content having a first lifecycle state from the plurality of lifecycle states;
   electronically communicating the content based on the lifecycle and first priority;
   changing the first lifecycle state to a second lifecycle state within the first priority;
   electronically communicating the content based on the lifecycle and the second lifecycle state;
   changing the first priority to a second priority; and
   electronically communicating the content based on the lifecycle and second priority.

2. A method as recited in claim 1 wherein assigning a category and content identifier to content comprises assigning the category and content identifier to an advertisement.

3. A method as recited in claim 1 wherein assigning a category and content identifier to content comprises assigning the category and content identifier to a movie.

4. A method as recited in claim 1 wherein further comprising assigning a rights start date and a rights end date to the content.

5. A method as recited in claim 4 wherein changing the first lifecycle state to a second lifecycle state comprises changing the first lifecycle state to the second lifecycle in response to the rights start date.

6. A method as recited in claim 1 wherein communicating the category and the content identifier comprise communicating the category and the content identifier from a listing service to the prioritizer within metadata.

7. A method as recited in claim 1 further comprising assigning a linear start date to the content.

8. A method as recited in claim 7 wherein changing the first lifecycle state to a second lifecycle state comprises changing the first lifecycle state to the second lifecycle state based on the linear start date.

9. A method as recited in claim 1 wherein assigning a first priority to the content comprises assigning the first priority based on a push lifecycle state.

10. A method as recited in claim 1 wherein assigning a first priority to the content comprises assigning the first priority based on a carousel lifecycle state.

11. A method as recited in claim 1 wherein changing the first lifecycle state comprises changing the first lifecycle state to a linear state and removing the content from the first priority in response to the linear state.

12. A method as recited in claim 1 further comprising determining a demand for the content and changing the first priority in response to the demand.

13. A method as recited in claim 12 wherein determining a demand comprises determining the demand based on aggregated user wanted list data.

14. A method as recited in claim 12 wherein determining a demand comprises determining the demand after collecting data from customer user devices.

15. A method as recited in claim 14 wherein after collecting determining an average weighted rank for the content.

16. A method as recited in claim 12 wherein determining a demand comprises determining the demand based on aggregated user viewing data.

17. A method as recited in claim 12 wherein determining a demand comprises estimating a purchase rate.

18. A method as recited in claim 12 wherein assigning a priority comprises assigning a high priority or a low priority.

19. A method as recited in claim 1 wherein the second lifecycle state comprises a composite lifecycle state comprising more than one lifecycle state.

20. A system comprising:
    a prioritizer; and
    a listing module communicating a content category and content identifier to the prioritizer;
    said content category and said content identifier are assigned to a content;
    said prioritizer associating a lifecycle having a plurality of lifecycle states with the content category, assigning a first priority to the content having a first lifecycle state from the plurality of lifecycle states;
    a content processing system controlling broadcasting the content based on the lifecycle and the first priority;
    said prioritizer changing the first lifecycle state to a second lifecycle state within the first priority;
    said content processing system controlling broadcasting the content based on the lifecycle and the second lifecycle state;
    said prioritizer changing the first priority to a second priority; and
    said content processing system controlling broadcasting the content based on the lifecycle and second priority.

21. A system as recited in claim 20 wherein the content comprises an advertisement.

22. A system as recited in claim 20 wherein the content identifier comprises a movie.

23. A system as recited in claim 20 wherein further comprising assigning a rights start date and a rights end date to the content.

24. A system as recited in claim 23 wherein the prioritizer changes the first lifecycle state to the second lifecycle state comprises in response to the rights start date.

25. A system as recited in claim 20 wherein a listing service communicates the category and the content identifier to the prioritizer within metadata.

26. A system as recited in claim 20 wherein prioritizer changes the first lifecycle state to the second lifecycle state based on a linear start date.

27. A system as recited in claim 20 wherein the prioritizer assigns a first priority to the content based on a push lifecycle state.

28. A system as recited in claim 20 wherein the prioritizer assigns a first priority to the content based on a carousel lifecycle state.

29. A system as recited in claim 20 wherein the prioritizer removes the content from the first priority in response to a linear state.

30. A system as recited in claim 20 wherein the first lifecycle state comprises a priority.

31. A system as recited in claim 30 wherein the priority is determined based on demand for the content.

32. A system as recited in claim 31 wherein the demand is based on aggregated user wanted list data.

33. A system as recited in claim 31 wherein the demand is based on data collected from a user device.

34. A system as recited in claim 33 wherein the prioritizer determines an average weighted rank for the content.

35. A system as recited in claim 31 wherein the demand is based on aggregated user viewing data.

36. A system as recited in claim 31 wherein the demand comprises an estimate of a purchase rate.

37. A system as recited in claim 30 wherein the priority comprises a high priority or a low priority.

38. A system as recited in claim 20 further comprising a listing service that notifies the prioritizer of new content with a notification signal and a content category signal for the new content.

39. A system as recited in claim 20 wherein the second lifecycle state comprises a composite lifecycle state comprising more than one lifecycle state.

40. A prioritizer in communication with a content processing system comprising:
a lifecycle manager module associating a lifecycle having a plurality of lifecycle states with a content category of a content;
a priority manager module assigning a first priority assignment to the content having a first lifecycle state from the plurality of lifecycle states;
said priority manager causing the content processing system to communicate content based on the lifecycle and the first priority assignment;
a state module changing the first lifecycle state to a second lifecycle state within the first priority assignment based on a time;
said priority manager causing the content processing system to communicate content based on the lifecycle and the second lifecycle state;
said priority manager module changing the first priority assignment to a second priority assignment; and
said priority manager causing the content processing system to communicate content based on the lifecycle and the second priority assignment.

41. A prioritizer as recited in claim 40 wherein state module changes the first lifecycle state to the second lifecycle state in response to a rights start date.

42. A prioritizer as recited in claim 40 wherein the state module changes the first lifecycle state to the second lifecycle state based on a linear start date.

43. A prioritizer as recited in claim 42 wherein the state module removes the content from the first priority in response to a linear state.

44. A prioritizer as recited in claim 42 wherein the priority manager module assigns a priority is based on demand for the content.

45. A prioritizer as recited in claim 42 further comprising a demand analyzer that determines an aggregate user demand based on data collected from a user device.

46. A prioritizer as recited in claim 45 wherein the demand analyzer determines the aggregate user demand based on wanted list data collected from a user device.

47. A prioritizer as recited in claim 45 wherein the demand analyzer determines the aggregate user demand based on viewing data collected from a user device.

48. A prioritizer as recited in claim 45 wherein the demand analyzer determines the aggregate user demand comprises a purchase rate.

* * * * *